US012692891B2

(12) United States Patent
Smith

(10) Patent No.: US 12,692,891 B2
(45) Date of Patent: Jul. 28, 2026

(54) FASTENER FOR EXPANDABLE BARRIER

(71) Applicant: Brady Groupe SAS, Roncq Cedex (FR)

(72) Inventor: Philip Forrest Smith, Nottingham (GB)

(73) Assignee: BRADY GROUPE SAS (FR)

( * ) Notice: Subject to any disclaimer, the term of this patent is extended or adjusted under 35 U.S.C. 154(b) by 726 days.

(21) Appl. No.: 18/085,738

(22) Filed: Dec. 21, 2022

(65) Prior Publication Data

US 2023/0243380 A1 Aug. 3, 2023

(51) Int. Cl.
*F16B 21/10* (2006.01)
*E01F 13/04* (2006.01)

(52) U.S. Cl.
CPC .............. *F16B 21/10* (2013.01); *E01F 13/04* (2013.01)

(58) Field of Classification Search
CPC ........ E06B 9/0661; E01F 13/02; E01F 13/04; F16B 21/08; F16B 21/086; F16B 21/10; F16B 21/125; F16B 21/14
See application file for complete search history.

(56) References Cited

U.S. PATENT DOCUMENTS

| | | | | |
|---|---|---|---|---|
| 1,533,470 A | * | 4/1925 | Schmitt ................... | D06F 57/10 |
| | | | | 211/202 |
| 1,657,284 A | * | 1/1928 | Shonnard ................ | E06B 9/063 |
| | | | | 160/162 |
| 2,560,530 A | | 7/1951 | Burdick | |

(Continued)

FOREIGN PATENT DOCUMENTS

| | | | |
|---|---|---|---|
| AU | 2009250990 A1 | 7/2010 | |
| CA | 2233760 A1 | 11/1999 | |

(Continued)

OTHER PUBLICATIONS

JSP Titan Expanding Barriers https://www.seton.co.uk/jsp-titan-expanding-barriers.html#TRAF851%20RW.

(Continued)

*Primary Examiner* — Matthew R Mcmahon
(74) *Attorney, Agent, or Firm* — Brianna Schonenberg

(57) ABSTRACT

The present disclosure provides a fastener including (A) a female pin with a first annular wall with a first end and a second end; at least one female arm extending from the first end of the first annular wall, the female arm having a proximal end, a distal end, a female arm outer surface, and a female projection at the distal end that extends from the female arm outer surface; and a ledge at the second end of the first annular wall; and (B) a male pin with a second annular wall having a first end, a second end, and an outer diameter; at least one male arm extending from the first end of the second annular wall, the male arm having a proximal end, a distal end, a male arm outer surface, and a male projection at the distal end that extends from the male arm outer surface; and an annular projection at the second end of the second annular wall, the annular projection having an outer annular diameter that is greater than the outer diameter of the second annular wall. The male pin extends through the first annular wall of the female pin, such that the male projection contacts the ledge.

15 Claims, 20 Drawing Sheets

(56) References Cited

U.S. PATENT DOCUMENTS

| | | | | |
|---|---|---|---|---|
| 3,243,858 A * | 4/1966 | Melanson | .......... | A44B 17/0029 |
| | | | | 24/693 |
| 3,551,963 A | 1/1971 | Mosher, Jr. et al. | | |
| 3,810,703 A | 5/1974 | Pasbrig | | |
| 4,799,288 A | 1/1989 | Kimizawa | | |
| 4,965,846 A | 10/1990 | Williamson, IV | | |
| 5,069,586 A | 12/1991 | Casey | | |
| 5,143,500 A * | 9/1992 | Schuring | ............ | F16B 19/1027 |
| | | | | 411/339 |
| 5,704,592 A * | 1/1998 | White | .................. | E01F 13/022 |
| | | | | 256/25 |
| 6,126,356 A * | 10/2000 | Russell | ............. | G03G 15/0935 |
| | | | | 403/252 |
| 6,345,946 B1 * | 2/2002 | Mainini | ............... | F16B 21/086 |
| | | | | 411/339 |
| 6,427,858 B2 * | 8/2002 | Sabounjian | ............ | D06F 57/08 |
| | | | | 211/183 |
| 6,836,935 B2 | 1/2005 | Reiter | | |
| 6,916,050 B2 | 7/2005 | Milhas | | |
| 6,932,227 B1 * | 8/2005 | Glenn | ..................... | D06F 57/08 |
| | | | | 211/202 |
| 6,971,776 B2 | 12/2005 | Tomita et al. | | |
| 7,556,156 B2 * | 7/2009 | Lovizzaro | .............. | B01D 33/23 |
| | | | | 210/486 |
| 8,572,822 B2 * | 11/2013 | Hasegawa | .......... | A44B 17/0023 |
| | | | | 24/108 |
| 9,500,215 B2 * | 11/2016 | Kim | .......................... | F16B 2/26 |
| 10,094,166 B2 | 10/2018 | Reiner et al. | | |
| 10,098,453 B1 * | 10/2018 | Xu | .......................... | A47G 7/041 |
| 10,207,460 B2 | 2/2019 | Reznar | | |
| 10,246,937 B2 * | 4/2019 | Reiner | .................. | E06B 9/0661 |
| 11,111,944 B2 * | 9/2021 | Sulkowski | ............ | F16B 21/086 |
| 11,415,160 B2 * | 8/2022 | Sin Yan Too | ......... | F16B 19/004 |
| 11,649,937 B1 * | 5/2023 | Chen | ....................... | F21V 21/24 |
| | | | | 362/217.14 |
| 11,882,906 B2 * | 1/2024 | Lee | ..................... | B60R 13/0206 |
| 12,295,512 B1 * | 5/2025 | Qi | ............................ | A47G 7/02 |
| 2003/0197165 A1 | 10/2003 | Perelli | | |
| 2018/0171700 A1 | 6/2018 | Reiner et al. | | |
| 2021/0062850 A1 | 3/2021 | Sulkowski et al. | | |

FOREIGN PATENT DOCUMENTS

| | | | | | |
|---|---|---|---|---|---|
| CA | 2747979 C | 1/2019 | | | |
| CN | 201672220 U | 12/2010 | | | |
| CN | 102014684 B | 5/2013 | | | |
| CN | 105768722 A * | 7/2016 | .............. | A47G 7/00 |
| DE | 2343507 A1 | 3/1975 | | | |
| DE | 9310834 U1 | 11/1993 | | | |
| DE | 102010038835 A1 | 2/2012 | | | |
| EP | 1519662 B1 | 2/2008 | | | |
| FR | 1499495 A * | 10/1967 | ......... | F16B 19/1081 |
| GB | 550626 A | 1/1943 | | | |
| JP | 2012130493 A | 7/2012 | | | |
| WO | 1988001194 A1 | 2/1988 | | | |
| WO | 2012082908 A1 | 6/2012 | | | |

OTHER PUBLICATIONS

Heavy-Duty Extending Trellis Barriers https://www.seton.co.uk/heavy-duty-extending-trellis-barriers-2.html#306RVB201.

Expanding Trellis Barrier—With Fixing Post and Wheels https://www.seton.co.uk/expanding-trellis-barrier-with-fixing-post-and-wheels.html#306RTA200.

Reliancer Expandable Mobile Barricade Portable Water Filled Expanding Safety Barrier Gate Outdoor Plastic Retractable Traffic Fence Flexible Crowd Control Barriers Guard Extensible to 8.2FT https://www.amazon.com/Reliancer-Expandable-Barricade-Retractable-Extensible/dp/B08221Z29X/ref=sr_1_18?crid=3ITIDQPE3PIKW&keywords=jsp+titan+expanding+barrier&qid=1658861119&sprefix=jsp+titan+expanding+barri%2Caps%2C143&sr=8-18.

European Patent Office: European Search Report issued in counterpart application No. EP22305104. Date of Report: Jul. 5, 2022.

* cited by examiner

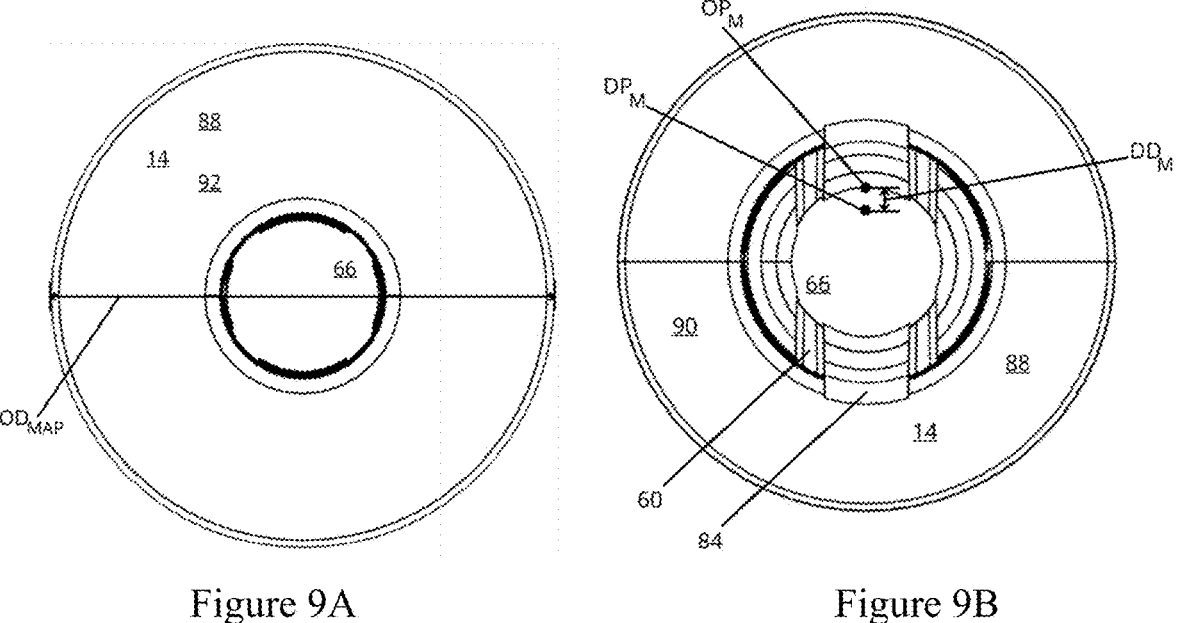
Figure 9A                    Figure 9B
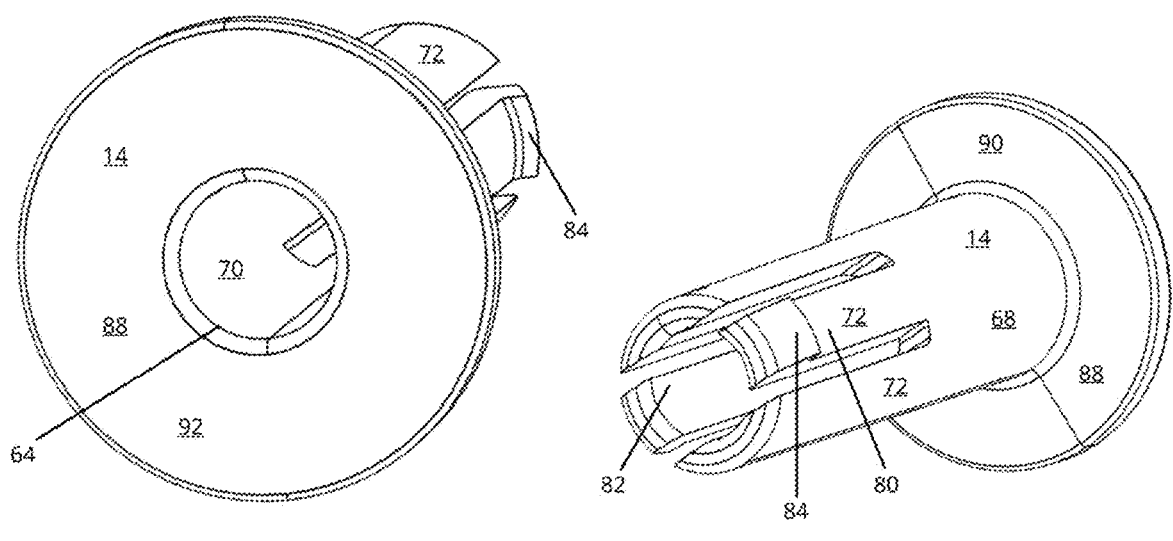
Figure 10                    Figure 11

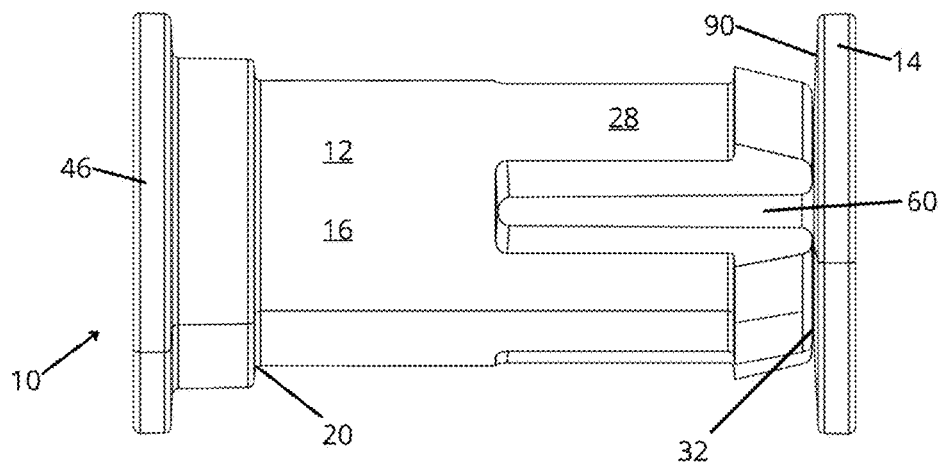
Figure 15
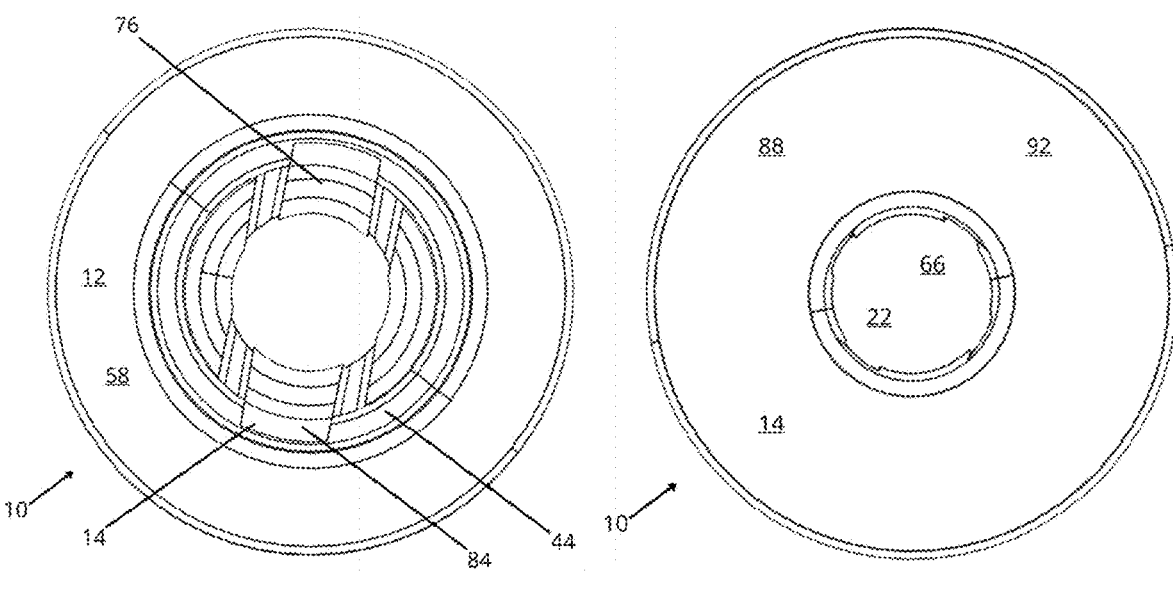
Figure 16                                    Figure 17

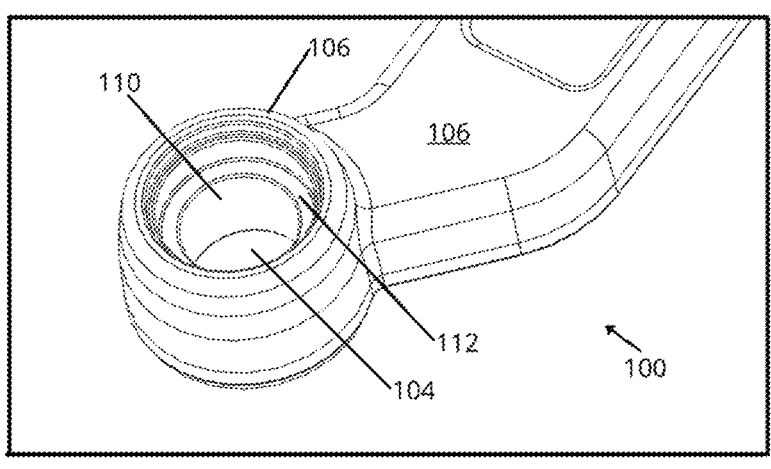
Figure 26B
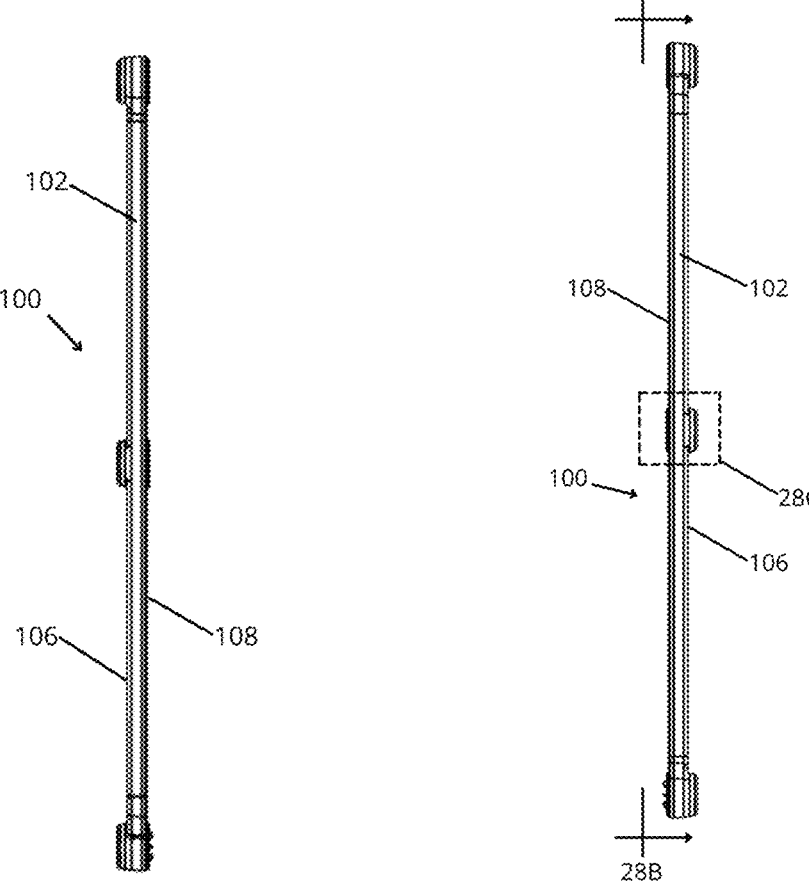
Figure 27
Figure 28A 728    716

740

712

840    828

816

828    812

928    916

940    912

FASTENER FOR EXPANDABLE BARRIER

BACKGROUND

The present disclosure is directed to fasteners for an expandable barrier.

A longstanding problem in expandable barriers is forming rotatable connections between the arms of the expandable barrier that are sufficiently durable to withstand repeated expansions and contractions of the barrier. Attempts have been made to form these rotatable connections with threaded fittings, such as bolt and nut assemblies. However, these threaded fittings can loosen over time as the arms rotate around the connection, resulting in an unstable and/or unusable barrier. Attempts have also be made to form these rotatable connections with rivets. However, the formation of a riveted connection requires special equipment (such as a riveting machine or a hammer Additionally, rivets are prone to breakage after repeated expansions and contractions of the barrier, and are difficult for a user to replace.

The art recognizes the need for a fastener suitable for forming rotatable connections between the arms of an expandable barrier that do not loosen over time as the arms rotate around the connection. The art also recognizes the need for a fastener suitable for forming rotatable connections between the arms of an expandable barrier that does not break after repeated expansions and contractions of the barrier.

SUMMARY

The present disclosure provides a fastener. In an embodiment, the fastener includes: (A) a female pin with (i) a first annular wall with a first end and a second end; (ii) at least one female arm extending from the first end of the first annular wall, the female arm having a proximal end, a distal end, a female arm outer surface, and a female projection at the distal end that extends from the female arm outer surface; and (iii) a ledge at the second end of the first annular wall; and (B) a male pin with (i) a second annular wall having a first end, a second end, and an outer diameter; (ii) at least one male arm extending from the first end of the second annular wall, the male arm having a proximal end, a distal end, a male arm outer surface, and a male projection at the distal end that extends from the male arm outer surface; and (iii) an annular projection at the second end of the second annular wall, the annular projection having an outer annular diameter that is greater than the outer diameter of the second annular wall. The male pin extends through the first annular wall of the female pin, such that the male projection contacts the ledge.

In another embodiment, the fastener includes: (A) a female pin with (i) a first annular wall with a first end and a second end; (ii) at least two female arms extending from the first end of the first annular wall, each female arm having a proximal end, a distal end, and a female arm outer surface, and at least two of the female arms have a female projection at the distal end that extends from the female arm outer surface; and (iii) a ledge at the second end of the first annular wall; and (B) a male pin with (i) a second annular wall having a first end, a second end, and an outer diameter; (ii) at least two male arms extending from the first end of the second annular wall, each male arm having a proximal end, a distal end, and a male arm outer surface, and at least two of the male arms have a male projection at the distal end that extends from the male arm outer surface; and (iii) an annular projection at the second end of the second annular wall, the annular projection having an outer annular diameter that is greater than the outer diameter of the second annular wall. The male pin extends through the first annular wall of the female pin, such that each male projection contacts the ledge.

The present disclosure also provides an expandable barrier. The expandable barrier includes (A) a plurality of the fasteners; (B) at least two posts, each post having a post wall and at least two post openings extending through the post wall; and (C) a plurality of elongate articles, each elongate article having an article wall, a first article opening extending through the article wall at a first end of the elongate article, and a second article opening extending through the article wall at a second end of the elongate article, the elongate articles arranged in a lattice pattern between the two posts such that (i) each of the first article openings is aligned with one of (a) the post openings or (b) the first article opening of a different elongate article, and one of the fasteners extends therethrough and forms a first rotatable connection; and (ii) each of the second article openings is aligned with one of (a) the post openings or (b) the second article opening of a different elongate article, and one of the fasteners extends therethrough and forms a second rotatable connection.

The present disclosure also provides a method of forming a connection between two articles. In an embodiment, the method includes (A) providing a female pin having (i) a first annular wall with a first end and a second end; (ii) at least one female arm extending from the first end of the first annular wall, the female arm having a proximal end, a distal end, a female arm outer surface, and a female projection at the distal end that extends from the female arm outer surface; and (iii) a first ledge positioned at the second end of the first annular wall; (B) providing a male pin having (i) a second annular wall with a first end, a second end, and an outer diameter; (ii) at least one male arm extending from the first end of the second annular wall, the male arm having a proximal end, a distal end, a male arm outer surface, and a male projection at the distal end that extends from the male arm outer surface; and (iii) an annular projection at the second end of the second annular wall, the annular projection having an outer annular diameter that is greater than the outer diameter of the second annular wall; (C) providing a first article having a first wall and a first opening extending through the first wall; (D) providing a second article having a second wall and a second opening extending through the second wall, the second wall having a second ledge; (E) aligning the first opening with the second opening; (F) inserting the female pin through the first opening and the second opening, such that the female projection contacts the second ledge; and (G) inserting the male pin through the first annular wall of the female pin, such that the male pin extends through the second opening and the first opening, and the male projection contacts the first ledge, thereby forming a connection between the first article and the second article.

In another embodiment, the method includes (A) providing a female pin having (i) a first annular wall with a first end and a second end; (ii) at least two female arms extending from the first end of the first annular wall, each female arm having a proximal end, a distal end, and a female arm outer surface, and at least two of the female arms have a female projection at the distal end that extends from the female arm outer surface; and (iii) a first ledge positioned at the second end of the first annular wall; (B) providing a male pin having (i) a second annular wall with a first end, a second end, and an outer diameter; (ii) at least two male arms extending from the first end of the second annular wall, each male arm having a proximal end, a distal end, and a male arm outer surface, and at least two of the male arms have a male projection at the distal end that extends from the male arm outer surface; and (iii) an annular projection at the second end of the second annular wall, the annular projection having an outer annular diameter that is greater than the outer diameter of the second annular wall; (C) providing a first article having a first wall and a first opening extending through the first wall; (D) providing a second article having a second wall and a second opening extending through the second wall, the second wall having a second ledge; (E) aligning the first opening with the second opening; (F) inserting the female pin through the first opening and the second opening, such that each female projection contacts the second ledge; and (G) inserting the male pin through the first annular wall of the female pin, such that the male pin extends through the second opening and the first opening, and each male projection contacts the first ledge, thereby forming a connection between the first article and the second article.

BRIEF DESCRIPTION OF THE DRAWINGS

FIG. 9A is a right side elevation view of a male pin in accordance with an embodiment of the present disclosure.

FIG. 9B is a left side elevation view of a male pin in accordance with an embodiment of the present disclosure.

FIG. 10 is a left bottom perspective view of a male pin in accordance with an embodiment of the present disclosure.

FIG. 11 is a top right perspective view of a male pin in accordance with an embodiment of the present disclosure.

FIG. 15 is a rear elevation view of a fastener in accordance with an embodiment of the present disclosure.

FIG. 16 is a left side elevation view of a fastener in accordance with an embodiment of the present disclosure.

FIG. 17 is a right side elevation view a fastener in accordance with an embodiment of the present disclosure.

FIG. 26B is a detailed perspective view of area 26B of FIG. 26A, in accordance with an embodiment of the present disclosure.

FIG. 27 is a right side elevation view of a first article in accordance with an embodiment of the present disclosure.

FIG. 28A is a left side elevation view of a first article in accordance with an embodiment of the present disclosure.

DEFINITIONS AND TEST METHODS

Figure 1:
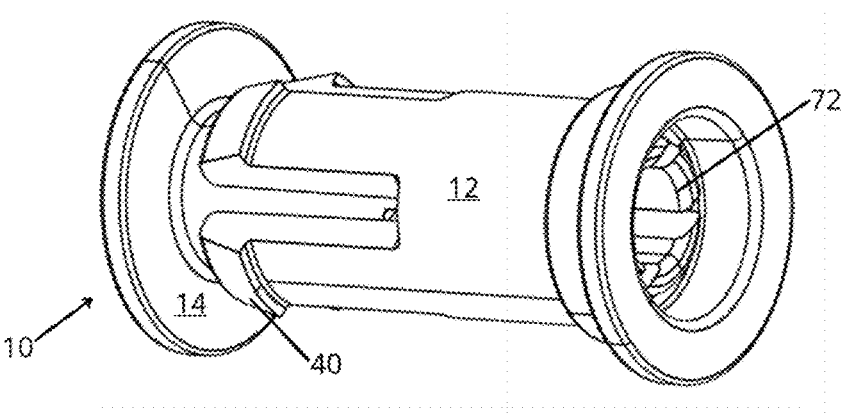
FIG. 1 is a rear perspective view of a fastener in accordance with an embodiment of the present disclosure.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranged containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

An "annular wall" is an elongated tube-shaped structure that defines an annular passageway extending through the elongated tube-shaped structure. The annular wall may or may not be a single-layer structure, or a multi-layer structure. In an embodiment, the annular wall is a single-layer structure.

The terms "comprising," "including," "having," and their derivatives, are not intended to exclude the presence of any additional component, step, or procedure, whether or not the same is specifically disclosed. In order to avoid any doubt, all articles claimed through use of the term "comprising" may include any additional component, feature, or element, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa. As used herein, "a," "an," "the," "at least one," and "one or more" are used interchangeably.

An "ellipse" is a plane curve such that the sum of the distances of each point in its periphery from two fixed points, the foci, are equal. The ellipse has a center which is the midpoint of the line segment linking two foci. The ellipse has a major axis (the longest diameter through the center). The minor axis is the shortest line through the center. The ellipse center is the intersection of the major axis and minor axis. A "circle" is a specific form of ellipse, where two focal points are in the same place (at the circle's center). Nonlimiting examples of ellipse shapes include circle, oval, and ovid.

The term "parallel," as used herein, refers to structures or axes extending in the same direction along the length of the structures or direction of the axes, wherein a spatial distance between the structures or axes does not change along the length of the structures or direction of the axes.

The term "perpendicular," as used herein, refers to structures or axes extending in directions that intersect at a 90°, or substantially a 90° angle along the length of the structures or direction of the axes.

A "polygon" is a closed-plane figure bounded by at least three sides. The polygon can be a regular polygon, or an irregular polygon having three, four, five, six, seven, eight, nine, ten, or more sides. Nonlimiting examples of suitable polygonal shapes include triangle, square, rectangle, diamond, trapezoid, parallelogram, hexagon, and octagon.

As used herein, "reversibly displaced" refers to a displacement from an original position to a displaced position, wherein the structure is capable of back-and-forth movement between the original position and the displaced position without breaking.

A "semi-rigid material" is a material that is capable of reversible deformation upon the application of pressure (a force), but holds its original structure in ambient environment. Nonlimiting examples of semi-rigid materials include polymer-based materials, metals, and combinations thereof. Nonlimiting examples of suitable polymer-based materials include propylene-based polymers, acetals, vinyls, ethylene-based polymers, and combinations thereof. A nonlimiting example of a suitable acetal is polyoxymethylene. A nonlimiting example of a suitable vinyl is polyvinyl chloride (PVC). A nonlimiting example of a suitable polyoxymethylene is DELRIN 500P, available from DuPont de Nemours, Inc. A nonlimiting example of a suitable propylene-based polymer is a propylene homopolymer. The semi-rigid material may or may not include an additive, such as a filler, a flame retardant, a surfactant, a UV-absorber, or a combination thereof. In an embodiment, the semi-rigid material includes a polymeric material and a filler (such as talc, glass fibers, or a combination thereof). In an embodiment, the semi-rigid material has a tensile modulus from 500 MPa, or 1000 MPa, or 1500 MPa, or 2000 MPa, or 3000 MPa to 3200 MPa, or 3500 MPa, or 4000 MPa, or 4500 MPa. In another embodiment, the semi-rigid material has a tensile modulus from 500 MPa to 4500 MPa, or from 1000 MPa to 4500 MPa, or form 2000 MPa to 4500 MPa, or from 2500 MPa to 4000 MPa, or from 2500 MPa to 3500 MPa, or from 3000 MPa to 3500 MPa.

Tensile modulus is measured in accordance with ISO 5271-1/-2.

DETAILED DESCRIPTION

The present disclosure provides a fastener. In an embodiment, the fastener includes (A) a female pin and (B) a male pin. The (A) female pin includes (i) a first annular wall with a first end and a second end; (ii) at least one female arm extending from the first end of the first annular wall, the female arm having a proximal end, a distal end, a female arm outer surface, and a female projection at the distal end that extends from the female arm outer surface; and (iii) a ledge at the second end of the first annular wall. The (B) male pin includes (i) a second annular wall having a first end, a second end, and an outer diameter; (ii) at least one male arm extending from the first end of the second annular wall, the male arm having a proximal end, a distal end, a male arm outer surface, and a male projection at the distal end that extends from the male arm outer surface; and (iii) an annular projection at the second end of the second annular wall, the annular projection having an outer annular diameter that is greater than the outer diameter of the second annular wall. The male pin extends through the first annular wall of the female pin, such that the male projection contacts the ledge.

In another embodiment, the fastener includes (A) a female pin and (B) a male pin. The (A) female pin includes (i) a first annular wall with a first end and a second end; (ii) at least two female arms extending from the first end of the first annular wall, each female arm having a proximal end, a distal end, and a female arm outer surface, and at least two of the female arms have a female projection at the distal end that extends from the female arm outer surface; and (iii) a ledge at the second end of the first annular wall. The (B) male pin includes (i) a second annular wall having a first end, a second end, and an outer diameter; (ii) at least two male arms extending from the first end of the second annular wall, each male arm having a proximal end, a distal end, and a male arm outer surface, and at least two of the male arms have a male projection at the distal end that extends from the male arm outer surface; and (iii) an annular projection at the second end of the second annular wall, the annular projection having an outer annular diameter that is greater than the outer diameter of the second annular wall. The male pin extends through the first annular wall of the female pin, such that each male projection contacts the ledge.

Figure 2:
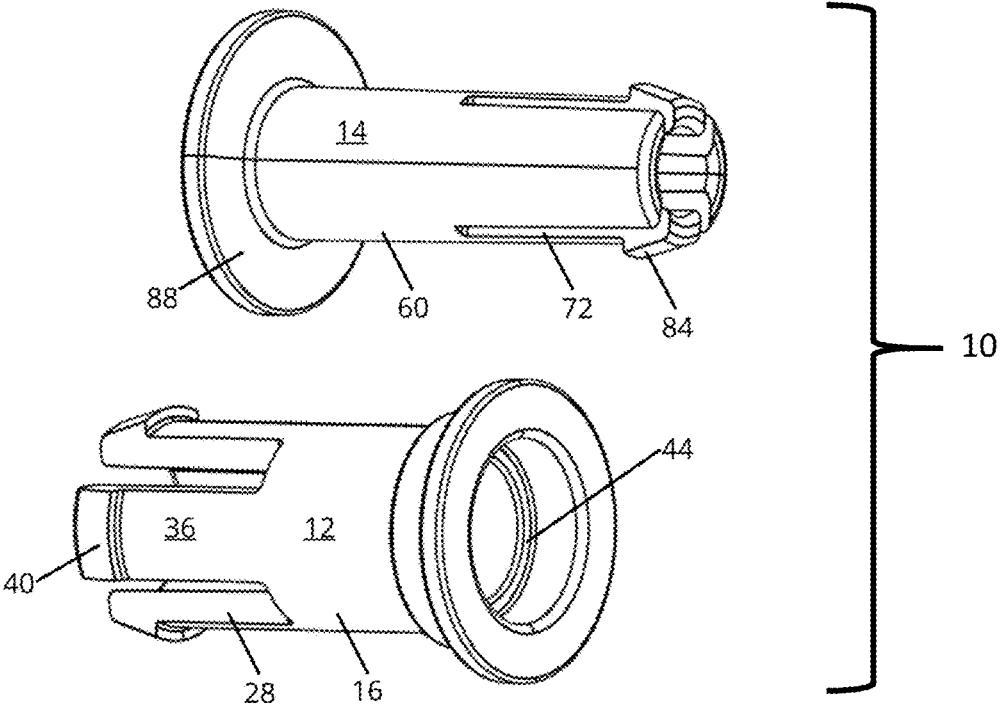
FIG. 2 is a front exploded perspective view of a fastener in accordance with another embodiment of the present disclosure.

FIGS. 1 and 2 show a fastener 10 with a female pin 12 and a male pin 14.

A. Female Pin

The fastener includes a female pin. The (A) female pin includes (i) a first annular wall with a first end and a second end; (ii) at least one female arm extending from the first end of the first annular wall, the female arm having a proximal end, a distal end, a female arm outer surface, and a female projection at the distal end that extends from the female arm outer surface; and (iii) a ledge at the second end of the first annular wall. In a further embodiment, the (A) female pin includes (ii) at least two female arms extending from the first end of the first annular wall, each female arm having a proximal end, a distal end, and a female arm outer surface, and at least two of the female arms have a female projection at the distal end that extends from the female arm outer surface.

Figure 6:
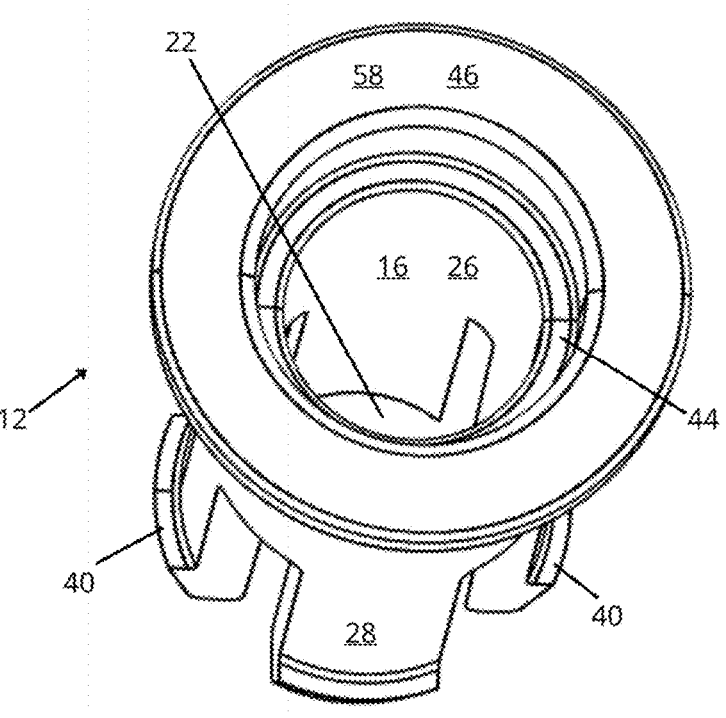
FIG. 6 is a bottom left perspective view of a female pin in accordance with an embodiment of the present disclosure.
Figure 7:
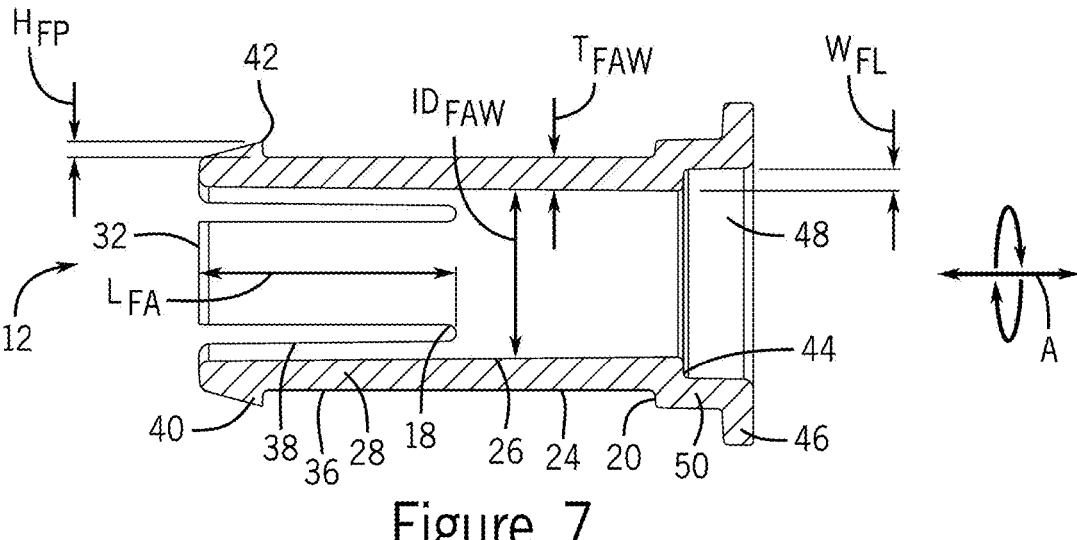
FIG. 7 is a cross-sectional view of the female pin taken along line 7-7 of FIG. 3B, in accordance with an embodiment of the present disclosure.

FIGS. 3A to 7 depict an embodiment of a female pin 12. The female pin 12 includes a first annular wall 16. The first annular wall 16 has a first end 18 and an opposing second end 20. The first annular wall 16 defines a first annular passageway 22. The first annular wall 16 has opposing surfaces—a first outer surface 24 and a first inner surface 26—as shown in FIG. 7.

The first annular wall 16 has a cross-sectional shape that is an ellipse. In an embodiment, the first annular wall 16 has a cross-sectional shape that is a circle, as shown in FIG. 4B.

Figure 3A:
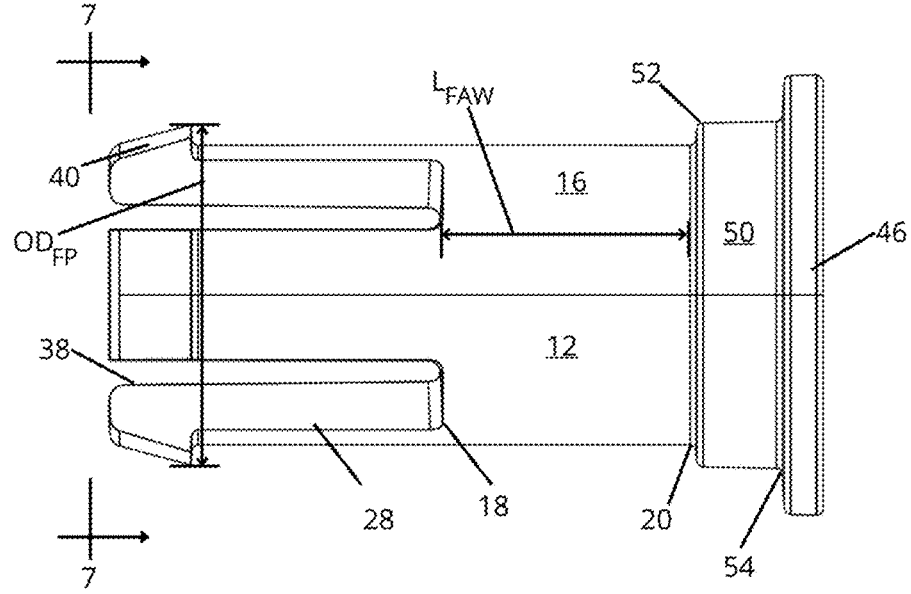
FIG. 3A is a front elevation view of a female pin in accordance with another embodiment of the present disclosure. The rear elevation view is a mirror image of the front elevation.
Figure 3B:
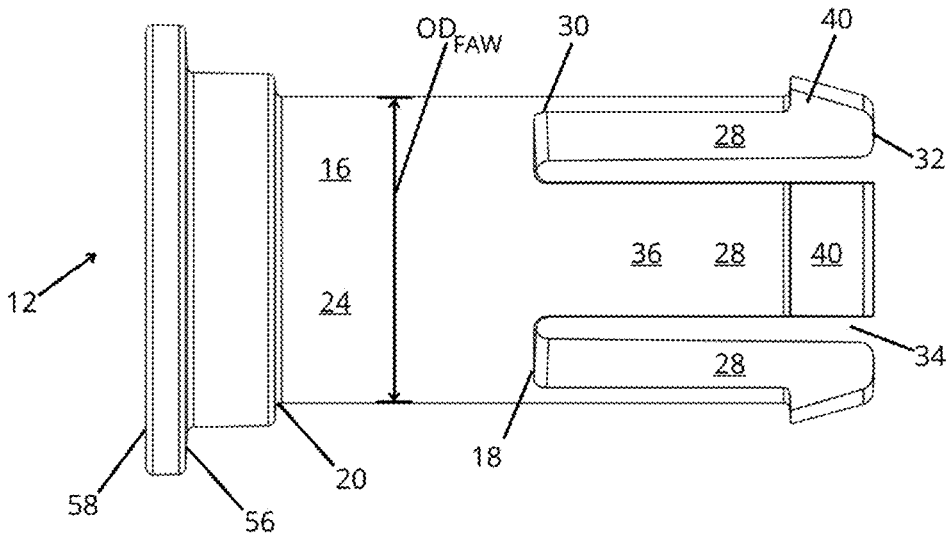
FIG. 3B is a top plan view of a female pin in accordance with an embodiment of the present disclosure. The bottom plan view of a mirror image of the top plan.

The first annular wall 16 has an outer diameter, $OD_{FAW}$, as shown in FIG. 3B. The outer diameter, $OD_{FAW}$, is greater than 0 mm, or greater than 5 mm, or greater than 10 mm, or greater than 15 mm. In an embodiment, the outer diameter, $OD_{FAW}$, is from 10 mm, or 15 mm, or 20 mm to 25 mm, or 30 mm, or 40 mm, or 50 mm, or 60 mm. In a further embodiment, the outer diameter, $OD_{FAW}$, is from 10 mm to 60 mm, or from 15 mm to 40 mm, or from 20 mm to 30 mm, or from 20 mm to 25 mm. The first annular wall 16 has an inner diameter, $ID_{FAW}$, as shown in FIG. 7. The inner diameter, $ID_{FAW}$, is greater than 0 mm, or greater than 5 mm, or greater than 10 mm, or greater than 15 mm. In an embodiment, the inner diameter, $ID_{FA}w$, is from 5 mm, or 10 mm, or 15 mm, or 16 mm to 18 mm, or 20 mm, or 25 mm, or 30 mm, or 40 mm, or 50 mm. In a further embodiment, the inner diameter, $ID_{FAW}$, is from 5 mm to 50 mm, or from 10 mm to 30 mm, or from 15 mm to 20 mm. It is understood that the outer diameter, $OD_{FAW}$, is greater than the inner diameter, $ID_{FAW}$.

The first annular wall 16 has a length, $L_{FAW}$, as shown in FIG. 3A. The first annular wall length, $L_{FAW}$, is greater than 0, or greater than 5 mm, or greater than 10 mm, or greater than 15 mm. In an embodiment, the first annular wall length, $L_{FAW}$, is from 5 mm, or 10 mm, or 15 mm, or 18 mm to 20 mm, or 25 mm, or 30 mm, or 50 mm, or 70 mm. In a further embodiment, the first annular wall length, $L_{FAW}$, is from 5 mm to 70 mm, or from 10 mm to 50 mm, or from 10 mm to 30 mm, or from 15 mm to 25 mm, or from 15 mm to 20 mm.

In an embodiment, the first annular wall 16 has a wall thickness, $T_{FAW}$, as shown in FIG. 7. The first annular wall thickness, $T_{FAW}$, is greater than 0 mm, or greater than 1 mm, or greater than 2 mm, or greater than 3 mm. In an embodiment, the first annular wall thickness, $T_{FAW}$, is from 1 mm, or 2 mm, or 3 mm to 4 mm, or 5 mm, or 10 mm, or 15 mm, or 20 mm. In a further embodiment, the first annular wall thickness, $T_{FAW}$, is from 1 mm to 20 mm, or from 1 mm to 10 mm, or from 1 mm to 5 mm, or from 2 mm to 5 mm.

At least one female arm 28 extends from the first end 18 of the first annular wall 16. In a further embodiment, at least two female arms 28 extend from the first end 18 of the first annular wall 16. Each female arm 28 has a proximal end 30 and an opposing distal end 32, as shown in FIG. 3B. The proximal end 30 is proximate to the first end 18 of the first annular wall 16. Each female arm 28 is a continuous elongate structure. In an embodiment, the female arms 28 are radially arranged around the circumference of the first annular wall 16. The spacing between the female arms 28 may or may not be equidistant. In an embodiment, each female arm 28 is radially arranged around the circumference of the first annular wall 16, and a space 34 (or void) exists between each female arm 28, each space 34 spanning a distance that is equal to the distance spanned by the other spaces 34.

Each female arm 28 has opposing surfaces—a female arm outer surface 36 and a female arm inner surface 38, as shown in FIG. 7. The female arm outer surface 36 may or may not be coextensive with the first outer surface 24 of the first annular wall 16. In an embodiment, the female arm outer surface 36 is coextensive with the first outer surface 24 of the first annular wall 16. The female arm inner surface 38 may or may not be coextensive with the first inner surface 26 of the first annular wall 16. In an embodiment, the female arm inner surface 38 is coextensive with the first inner surface 26 of the first annular wall 16.

In an embodiment, each female arm 28 extends from the first end 18 of the first annular wall 16 in a parallel orientation, or a substantially parallel orientation, with respect to the other female arms 28. FIGS. 3A and 3B depict female arms 28 that extend in a parallel orientation with respect to one another.

The female pin 12 includes at least one, or at least two female arms 28. In an embodiment, the female pin 12 includes one, two, or three, or four, or five, or six female arms 28. In another embodiment, the female pin 12 includes from one, or two, or three to four, or five, or six, or eight, or ten female arms 28. In a further embodiment, the female pin 12 includes four female arms 28, as shown in FIG. 4B.

In an embodiment, each female arm 28 has a length, $L_{FA}$, as shown in FIG. 7. The length, $L_{FA}$, of each female arm 28 is greater than 0 mm, or greater than 5 mm, or greater than 10 mm, or greater than 15 mm, or greater than 20 mm, or greater than 25 mm. In an embodiment, the length, $L_{FA}$, of each female arm 28 is from 5 mm, or 10 mm, or 15 mm, or 20 mm, or 25 mm to 30 mm, or 40 mm, or 50 mm, or 60 mm, or 70 mm. In a further embodiment, the length, $L_{FA}$, of each female arm 28 is from 5 mm to 70 mm, or from 10 mm to 50 mm, or from 15 mm to 40 mm, or from 20 mm to 30 mm, or from 25 mm to 30 mm.

In an embodiment, the first annular wall length, $L_{FAW}$, is less than, equal to, or greater than the female arm length, $L_{FA}$. In a further embodiment, the first annular wall length, $L_{FAW}$, is less than the female arm length, $L_{FA}$. In an embodiment, a ratio of the distance of the first annular wall length, $L_{FAW}$, to the female arm length, $L_{FA}$, (the "$L_{FAW}$:$L_{FA}$ Ratio") is from 1:1 to 1:2, or from 1:1 to 1:1.5, or from 1:1 to 1:1.4, or from 1:1.2 to 1:1.5.

At least one, or at least two female arms 28 include a female projection 40 at the distal end 32 that extends from the female arm outer surface 36. In an embodiment, the female projection 40 extends radially outward from the female arm outer surface 36. In an embodiment, each female arm 28 includes a female projection 40, as shown in FIG. 4B. In another embodiment, the female pin 12 includes at least one female arm 28 that does not include, or is void of, a female projection 40. In a further embodiment, the female pin 12 includes four female arms 28, two of which include a female projection 40 and two of which do not include a female projection 40.

In an embodiment, the female pin 12 has a central axis A, as shown in FIG. 7. The central axis, A, is parallel to and extends through the first annular passageway 22. In a further embodiment, each female projection 40 extends away from, or perpendicular to, the central axis, A, as shown in FIG. 7.

In an embodiment, each female projection 40 has a projection height, $H_{FP}$, as shown in FIG. 7. The projection height, $H_{FP}$, is the distance between the female arm outer surface 36 and a location 42 on the female projection 40 that is furthest away from the central axis, A, of the female pin 12. The projection height, $H_{FP}$, of each female projection 40 may be the same or different. In an embodiment, each female projection 40 has the same projection height, $H_{FP}$. The projection height, $H_{FP}$, is greater than 0 mm, or greater than 1.0 mm, or greater than 2.0 mm. In an embodiment, the projection height, $H_{FP}$, is from 0.5 mm, or 1.0 mm, or 1.5 mm, or 2.0 mm to 2.5 mm, or 3.0 mm, or 5.0 mm, or 10 mm, or 20 mm. In a further embodiment, the projection height, $H_{FP}$, is from 0.5 mm to 20 mm, or from 1 mm to 5 mm, or from 1.5 mm to 3 mm, or from 2 mm to 2.5 mm.

Each female projection 40 has a cross-sectional shape. Nonlimiting examples of suitable cross-sectional shapes for the female projection 40 includes an ellipse, a polygon, a hook, and combinations thereof. In an embodiment, the female projection 40 has a polygon cross-sectional shape. FIGS. 3A, 3B, and 7 depict female projections 40 having a triangle cross-sectional shape.

In an embodiment, the female pin 12 has an outer female projection diameter, $OD_{FP}$, as shown in FIG. 3A. The outer female projection diameter, $OD_{FP}$, is greater than 0 mm, or greater than 5 mm, or greater than 10 mm, or greater than 15 mm, or greater than 20 mm, or greater than 25 mm. In an embodiment, the outer female projection diameter, $OD_{FP}$, is from 5 mm, or 10 mm, or 15 mm, or 20 mm, or 25 mm to 30 mm, or 35 mm, or 40 mm, or 50 mm. In another embodiment, the outer male projection diameter, $OD_{MP}$, is from 5 mm to 50 mm, or from 5 mm to 40 mm, or from 10 mm to 30 mm, or from 15 mm to 30 mm, or from 20 mm to 30 mm. It is understood that the outer female projection diameter, $OD_{FP}$, is greater than the outer diameter, $OD_{FAW}$, which is greater than the inner diameter, $ID_{FAW}$.

In an embodiment, the distal end 32 of each female arm 28 is capable of being reversibly displaced towards the central axis, A, of the female pin 12. In an embodiment, upon the application of pressure (a force) on the female projection 40, the distal end 32 of the female arm 28 moves from an original position, $OP_F$, towards the central axis, A, to a displaced position, $DP_F$, as shown in FIG. 4B. When the pressure is removed, distal end 32 of the female arm 28 moves back to the original position, $OP_F$. The displacement distance, $DD_F$, is the distance between the original position, $OP_F$, and the displaced position, $DP_F$. In an embodiment, the displacement distance, $DD_F$, is equal to, or greater than, the female projection height, $H_{FP}$.

Figure 4A:
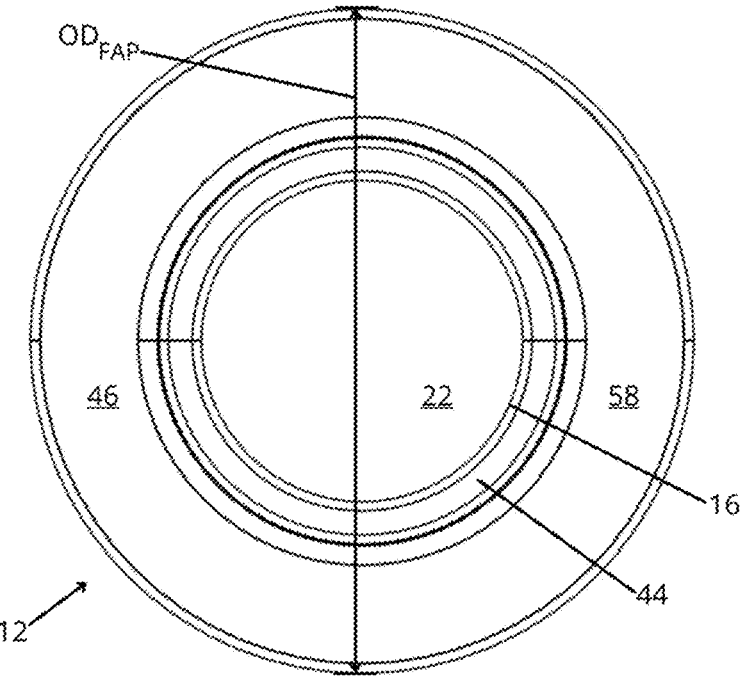
FIG. 4A is a left side elevation view of a female pin in accordance with an embodiment of the present disclosure.
Figure 4B:
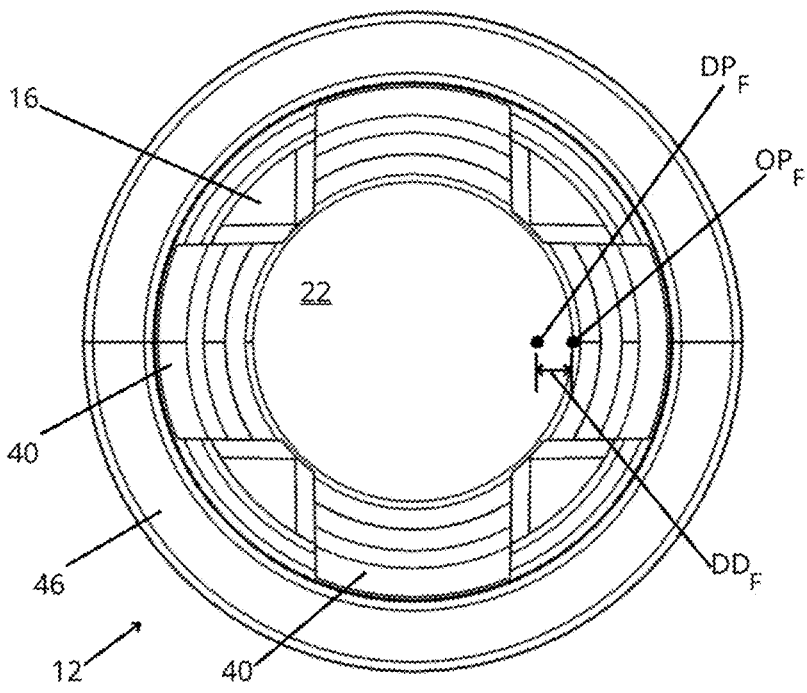
FIG. 4B is a right side elevation view of a female pin in accordance with an embodiment of the present disclosure.
Figure 5:
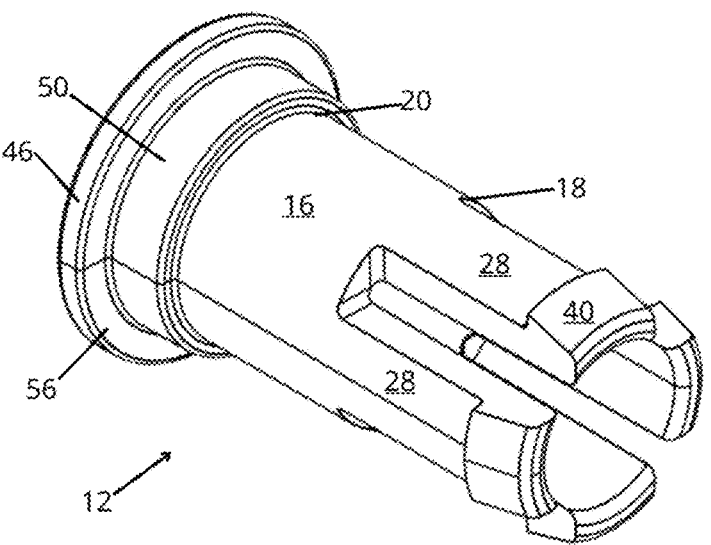
FIG. 5 is a top, front, right perspective view of a female pin in accordance with an embodiment of the present disclosure.

The female pin 12 includes a ledge 44 at the second end 20 of the first annular wall 16, as shown in FIG. 4A and FIG. 7. The ledge 44 is an annular surface extending perpendicular, or substantially perpendicular, to the central axis, A, of the female pin 12. In an embodiment, the ledge 44 extends perpendicular, or substantially perpendicular, to one or more of the first outer surface 24 (of the first annular wall 16), the first inner surface 26 (of the first annular wall 16), the female arm outer surface 36, and the female arm inner surface 38.

The ledge 44 has a width, $W_{FL}$, as shown in FIG. 7. The ledge width, $W_{FL}$, is greater than 0 mm, or greater than 1.0 mm, or greater than 2.0 mm. In an embodiment, the ledge width, $W_{FL}$, is from 0.5 mm, or 1.0 mm, or 1.5 mm, or 2.0 mm to 2.5 mm, or 3.0 mm, or 5.0 mm, or 10 mm, or 20 mm. In a further embodiment, the ledge width, $W_{FL}$, is from 0.5 mm to 20 mm, or from 1 mm to 5 mm, or from 1.5 mm to 3 mm, or from 2 mm to 2.5 mm.

In an embodiment, the female pin 12 includes an annular projection 46, as shown in FIG. 6. The annular projection 46 extends away from the central axis, A, of the female pin 12. The annular projection 46 may or may not be a continuous structure. In an embodiment, the annular projection is a continuous structure extending along the circumference of the female pin 12, as shown in FIG. 4A. The annular projection 46 may or may not form the ledge 44. In an embodiment, the annular projection 46 forms the ledge 44. In another embodiment, the ledge 44 and the annular projection 46 are distinct surfaces that are not coextensive.

The annular projection 46 has an outer diameter, $OD_{FAP}$, as shown in FIG. 4A. The outer diameter, $OD_{FAP}$, of the annular projection 46 is greater than the outer diameter, $OD_{FAW}$, of the first annular wall 16. The annular projection outer diameter, $OD_{FAP}$, is greater than 0 mm, or greater than 5 mm, or greater than 10 mm, or greater than 20 mm, or greater than 30 mm. In an embodiment, the annular projection outer diameter, $OD_{FAP}$, is from 5 mm, or 10 mm, or 20 mm, or 25 mm, or 30 mm to 35 mm, or 40 mm, or 50 mm, or 60 mm, or 100 mm. In a further embodiment, the annular projection outer diameter, $OD_{FAP}$, is from 5 mm to 100 mm, or from 20 mm to 100 mm, or from 20 mm to 50 mm, or from 30 mm to 50 mm, or from 30 mm to 40 mm.

In an embodiment, the annular projection 46 has an inner surface 56 and an opposing outer surface 58, as shown in FIG. 3B. In an embodiment, the outer surface 58 forms a plane and, when the male pin 14 is positioned within the female pin 12, no portion of the male pin 14 extends beyond said plane.

Figures 18, 19:
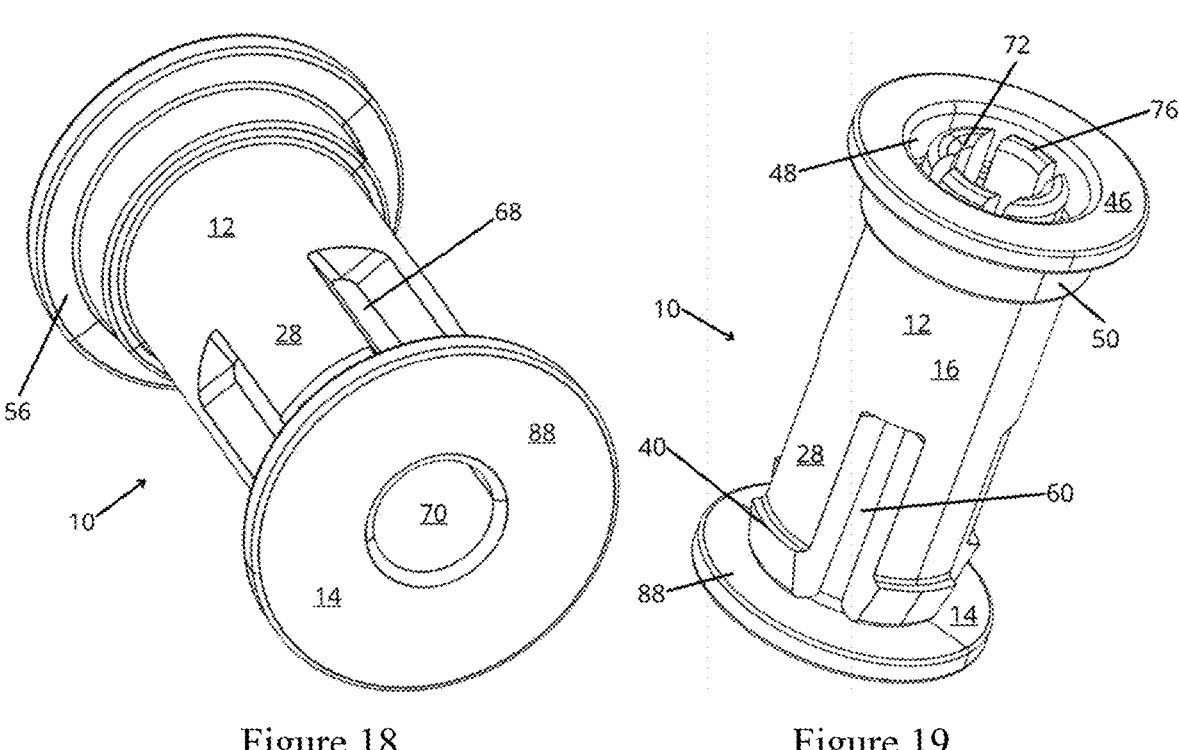
FIG. 18 is a top right perspective view a fastener in accordance with an embodiment of the present disclosure.
FIG. 19 is a rear left perspective view a fastener in accordance with an embodiment of the present disclosure.

In an embodiment, a recess 48 exists between the ledge 44 and the annular projection 46, as shown in FIG. 7. The recess 48 is a void configured to receive the distal end 76 of the male arms 72, as shown in FIGS. 19 and 20. In an embodiment, the recess 48 is formed by a recess wall 50, as shown in FIG. 7. The recess wall 50 is an annular structure having a first end 52 adjacent the ledge 44 and a second end 54 adjacent the annular projection 46, as shown in FIG. 3A.

In an embodiment, the female pin 12 is formed from a semi-rigid material. In an embodiment, the semi-rigid material is an acetal, or further a polyoxymethylene. In an embodiment, the female pin 12 is formed by molding, such as injection molding.

The female pin 12 may have an integral design or a composite design. A structure having an "integral design" is a component formed from one piece of material, such as a molded piece. A structure having a "composite design" is a component formed from more than one distinct piece (or part), which upon assembly are combined. In an embodiment, the female pin 12 has an integral design.

Figure 36A:
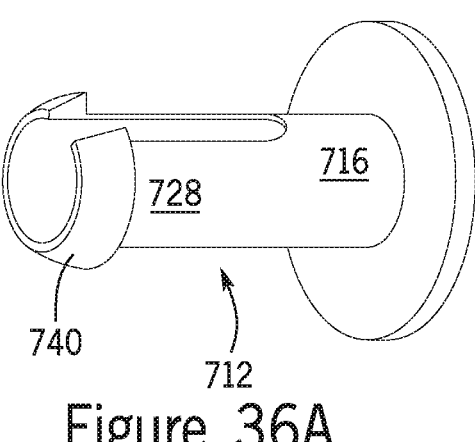
FIG. 36A is a perspective view of a female pin in accordance with an embodiment of the present disclosure.
Figure 36B:
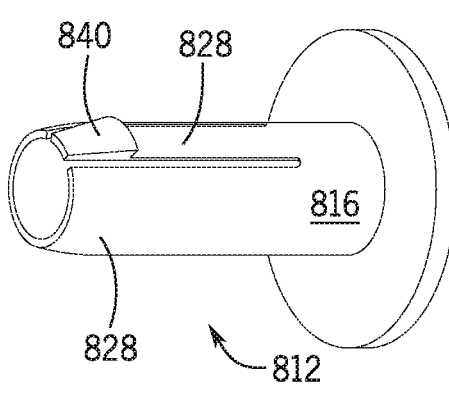
FIG. 36B is a perspective view of a female pin in accordance with another embodiment of the present disclosure.
Figure 36C:
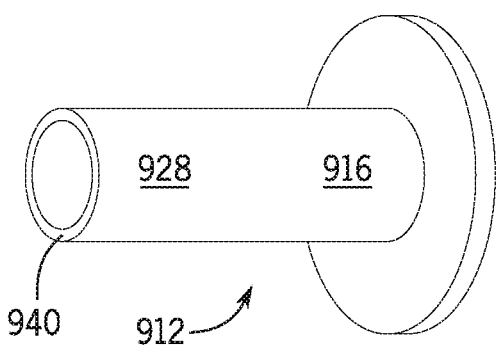
FIG. 36C is a perspective view of a female pin in accordance with another embodiment of the present disclosure.

FIGS. 36A, 36B, and 36C show alternate embodiments of the female pin 712, 812, 912 having one female arm 728, two female arms 828, and one female arm 928, respectively. Specifically, FIG. 36A depicts a female pin 712 with a first annular wall 716 and a single female arm 728, the female arm 728 having a female projection 740, and a space (or void) exists between opposing sides of the female arm 728. FIG. 36B depicts a female pin 812 with a first annular wall 816 and two female arms 828, wherein one of the female arms 828 has a female projection 840 while the other female arm 828 is void of a female projection. FIG. 36C depicts a female pin 912 with a first annular wall 916 and a single female arm 928 having a female projection 940, wherein the first annular wall 916 and the female arm 928 are coextensive and integral.

The female pin 12, 712, 812, 912 may comprise two or more embodiments disclosed herein. For purposes of the present disclosure, references to the female pin 12 shall also refer to the female pins 712, 812, and 912.

B. Male Pin

The fastener includes a male pin. The (B) male pin includes (i) a second annular wall having a first end, a second end, and an outer diameter; (ii) at least one male arm extending from the first end of the second annular wall, the male arm having a proximal end, a distal end, a male arm outer surface, a male projection at the distal end that extends from the male arm outer surface; and (iii) an annular projection at the second end of the second annular wall, the annular projection having an outer annular diameter that is greater than the outer diameter of the second annular wall. In a further embodiment, the (B) male pin includes (ii) at least two male arms extending from the first end of the second annular wall, each male arm having a proximal end, a distal end, and a male arm outer surface, and at least two of the male arms have a male projection at the distal end that extends from the male arm outer surface.

Figure 12:
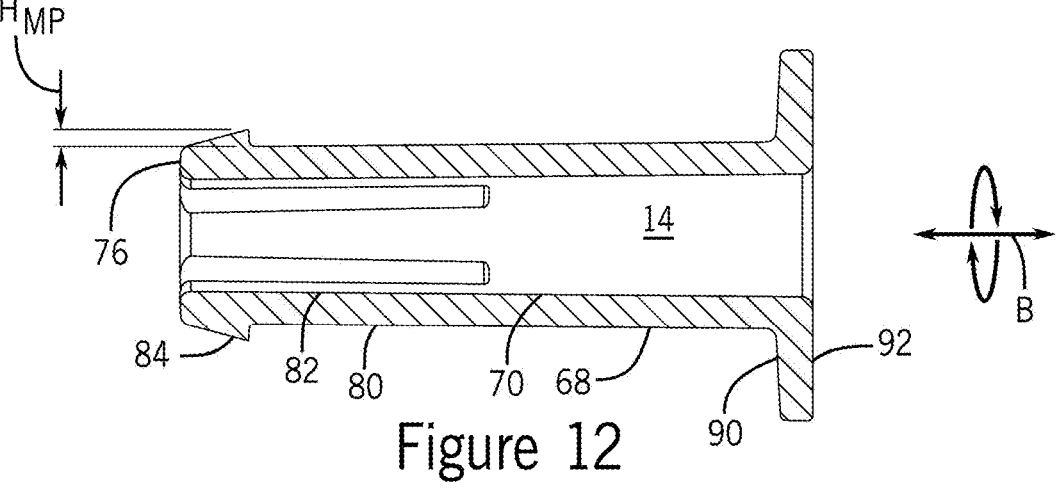
FIG. 12 is a cross-sectional view of the male pin taken along line 12A-12A of FIG. 8A, in accordance with an embodiment of the present disclosure.

FIGS. 8A to 13 depict an embodiment of a male pin 14. The male pin 14 includes a second annular wall 60. The second annular wall 60 has a first end 62 and an opposing second end 64, as shown in FIG. 8B. The second annular wall 60 defines a second annular passageway 66, as shown in FIGS. 9A and 9B. The second annular wall 60 has opposing surfaces—a second outer surface 68 and a second inner surface 70—as shown in FIG. 12.

The second annular wall 60 has a cross-sectional shape that is an ellipse. In an embodiment, the second annular wall 60 has a cross-sectional shape that is a circle, as shown in FIG. 9B.

Figure 13:
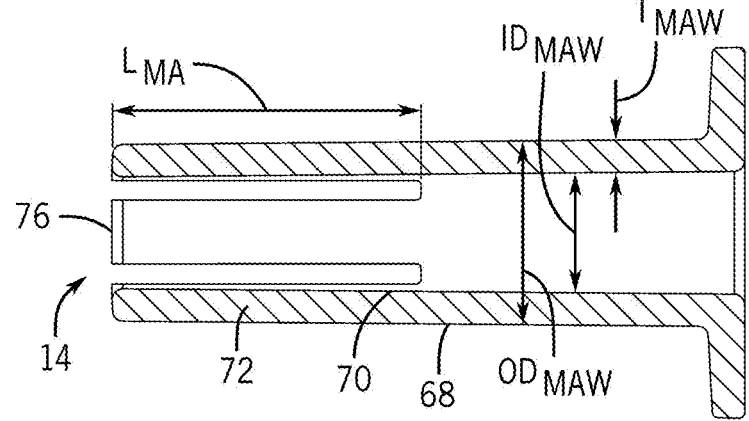
FIG. 13 is a cross-sectional view of the male pin taken along line 13-13 of FIG. 8B, in accordance with an embodiment of the present disclosure.

The second annular wall 60 has an outer diameter, $OD_{MAW}$, as shown in FIG. 13. The outer diameter, $OD_{MAW}$, is greater than 0 mm, or greater than 5 mm, or greater than 10 mm, or greater than 15 mm. In an embodiment, the outer diameter, $OD_{MAW}$, is from 5 mm, or 10 mm, or 15 mm to 20 mm, or 25 mm, or 30 mm, or 40 mm, or 50 mm. In a further embodiment, the outer diameter, $OD_{MAW}$, is from 5 mm to 50 mm, or from 10 mm to 30 mm, or from 15 mm to 20 mm. The second annular wall 60 has an inner diameter, $ID_{MAW}$, as shown in FIG. 13. The inner diameter, $ID_{MAW}$, is greater than 0 mm, or greater than 5 mm, or greater than 10 mm. In an embodiment, the inner diameter, $ID_{MAW}$, is from 5 mm, or 10 mm, or 11 mm to 15 mm, or 20 mm, or 25 mm, or 30 mm, or 40 mm. In a further embodiment, the inner diameter, $ID_{MAW}$, is from 5 mm to 40 mm, or from 5 mm to 30 mm, or from 10 mm to 50 mm. It is understood that the outer diameter, $OD_{MAW}$, is greater than the inner diameter, $ID_{MAW}$.

Figure 8A:
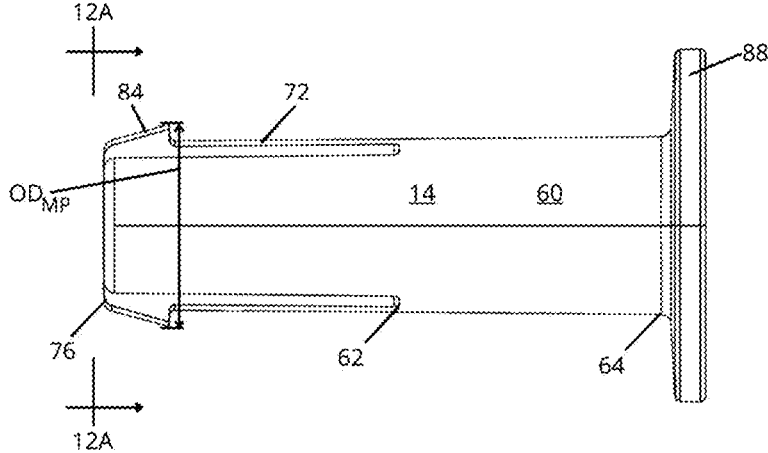
FIG. 8A is a front elevation view of a male pin in accordance with another embodiment of the present disclosure.
Figure 8B:
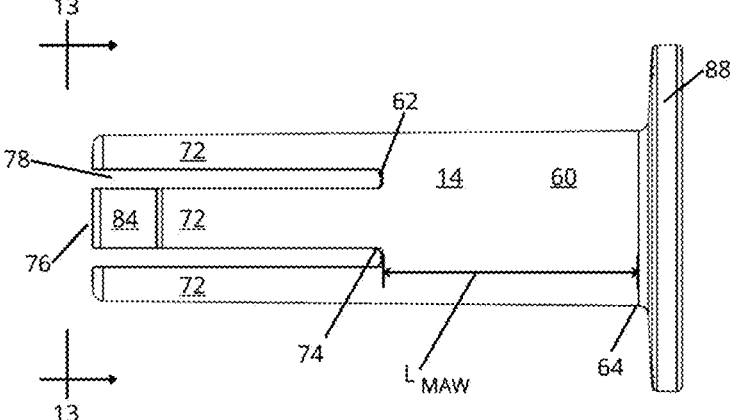
FIG. 8B is a top plan view of a male pin in accordance with an embodiment of the present disclosure.

The second annular wall 60 has a length, $L_{MAW}$, as shown in FIG. 8B. The second annular wall length, $L_{MAW}$, is greater than 0, or greater than 5 mm, or greater than 10 mm, or greater than 15 mm. In an embodiment, the second annular wall length, $L_{MAW}$, is from 5 mm, or 10 mm, or 15 mm, or 20 mm, or 25 mm to 30 mm, or 40 mm, or 50 mm, or 70 mm. In a further embodiment, the second annular wall length, $L_{MAW}$, is from 5 mm to 70 mm, or from 10 mm to 50 mm, or from 10 mm to 30 mm, or from 15 mm to 30 mm, or from 20 mm to 30 mm.

In an embodiment, the second annular wall 60 has a wall thickness, $T_{MAW}$, as shown in FIG. 13. The second annular wall thickness, $T_{MAW}$, is greater than 0 mm, or greater than 1 mm, or greater than 2 mm, or greater than 2.5 mm. In an embodiment, the second annular wall thickness, $T_{MAW}$, is from 1 mm, or 2 mm, or 2.5 mm to 3.5 mm, or 4 mm, or 5 mm, or 10 mm, or 15 mm, or 20 mm. In a further embodiment, the second annular wall thickness, $T_{MAW}$, is from 1 mm to 20 mm, or from 1 mm to 10 mm, or from 1 mm to 5 mm, or from 2 mm to 5 mm.

At least one male arm 72 extends from the first end 62 of the second annular wall 60. Each male arm 72 has a proximal end 74 and an opposing distal end 76, as shown in FIG. 8B. The proximal end 74 is proximate to the first end 62 of the second annular wall 60. Each male arm 72 is a continuous elongate structure. In an embodiment, the male arms 72 are radially arranged around the circumference of the second annular wall 60. The spacing between the male arms 72 may or may not be equidistant. In an embodiment, each male arm 72 is radially arranged around the circumference of the second annular wall 60, and a space 78 (or void) exists between each male arm 72, each space 78 spanning a distance that is equal to the distance spanned by the other spaces 78.

Each male arm 72 has opposing surfaces—a male arm outer surface 80 and a male arm inner surface 82, as shown in FIG. 11. The male arm outer surface 80 may or may not be coextensive with the second outer surface 68 of the second annular wall 60. In an embodiment, the male arm outer surface 80 is coextensive with the second outer surface 68 of the second annular wall 60. The male arm inner surface 82 may or may not be coextensive with the second inner surface 70 of the second annular wall 60. In an embodiment, the male arm inner surface 82 is coextensive with the second inner surface 70 of the second annular wall 60.

In an embodiment, each male arm 72 extends from the first end 62 of the second annular wall 60 in a parallel orientation, or a substantially parallel orientation, with respect to the other male arms 72. FIGS. 8A and 8B depict male arms 72 that extend in a parallel orientation with respect to one another.

The male pin 14 includes at least one, or at least two male arms 72. In an embodiment, the male pin 14 includes one, or two, or three, or four, or five, or six male arms 72. In another embodiment, the male pin 14 includes from one, or two, or three to four, or five, or six, or eight, or ten male arms 14. In a further embodiment, the male pin 14 includes four male arms 72, as shown in FIG. 11.

In an embodiment, each male arm 72 has a length, $L_{MA}$, as shown in FIG. 13. The length, $L_{MA}$, of each male arm 72 is greater than 0 mm, or greater than 5 mm, or greater than 10 mm, or greater than 15 mm, or greater than 20 mm, or greater than 25 mm. In an embodiment, the length, $L_{MA}$, of each male arm 72 is from 5 mm, or 10 mm, or 15 mm, or 20 mm, or 25 mm to 30 mm, or 40 mm, or 50 mm, or 60 mm, or 70 mm. In a further embodiment, the length, $L_{MA}$, of each male arm 72 is from 5 mm to 70 mm, or from 10 mm to 50 mm, or from 15 mm to 40 mm, or from 20 mm to 30 mm, or from 25 mm to 30 mm.

In an embodiment, the second annular wall length, $L_{MAW}$, is less than, equal to, or greater than the male arm length, $L_{MA}$. In a further embodiment, the second annular wall length, $L_{MAW}$, is less than the male arm length, $L_{MA}$. In an embodiment, a ratio of the distance of the second annular wall length, $L_{MAW}$, to the male arm length, $L_{MA}$, (the "$L_{MAW}$:$L_{MA}$ Ratio") is from 1:1 to 1:2, or from 1:1 to 1:1.5, or from 1:1 to 1:1.4, or from 1:1 to 1:1.3.

At least one, or at least two male arms 72 include a male projection 84 at the distal end 76 that extends from the male arm outer surface 80. In an embodiment, the male projection 84 extends radially outward from the male arm outer surface 80. In an embodiment, each male arm 72 includes a male projection 84. In another embodiment, the male pin 14 includes at least one male arm 72 that does not include, or is void of, a male projection 84. In a further embodiment, the male pin 14 includes four male arms 72, two of which include a male projection 84 and two of which do not include a male projection 84, as shown in FIGS. 9B and 11.

In an embodiment, the male pin 14 has a central axis B, as shown in FIG. 12. The central axis, B, is parallel to and extends through the second annular passageway 66. In a further embodiment, each male projection 84 extends away from, or perpendicular to, the central axis, B, as shown in FIG. 12.

In an embodiment, each male projection 84 has a projection height, $H_{MP}$, as shown in FIG. 12. The projection height, $H_{MP}$, is the distance between the male arm outer surface 80 and a location 86 on the male projection 84 that is furthest away from the central axis, B, of the male pin 14. The projection height, $H_{MP}$, of each male projection 84 may be the same or different. In an embodiment, each male projection 84 has the same projection height, $H_{MP}$. The projection height, $H_{MP}$, is greater than 0 mm, or greater than 1.0 mm, or greater than 2.0 mm. In an embodiment, the projection height, $H_{MP}$, is from 0.5 mm, or 1.0 mm, or 1.5 mm, or 2.0 mm to 2.5 mm, or 3.0 mm, or 5.0 mm, or 10 mm, or 20 mm. In a further embodiment, the projection height, $H_{MP}$, is from 0.5 mm to 20 mm, or from 1 mm to 5 mm, or from 1.5 mm to 3 mm, or from 2 mm to 2.5 mm.

In an embodiment, the projection height, $H_{MP}$, is equal to, or less than, the ledge width, $W_{FL}$. In other words, the ledge width, $W_{FL}$, is equal to, or greater than, the projection height, $H_{MP}$.

Each male projection 84 has a cross-sectional shape. Nonlimiting examples of suitable cross-sectional shapes for the male projection 84 includes an ellipse, a polygon, a hook, and combinations thereof. In an embodiment, the male projection 84 has a polygon cross-sectional shape. FIGS. 8A and 12 depict male projections 84 having a triangle cross-sectional shape.

In an embodiment, the male pin 14 has an outer male projection diameter, $OD_{MP}$, as shown in FIG. 8A. The outer male projection diameter, $OD_{MP}$, is greater than 0 mm, or greater than 5 mm, or greater than 10 mm, or greater than 15 mm. In an embodiment, the outer male projection diameter, $OD_{MP}$, is from 5 mm, or 10 mm, or 15 mm, or 18 mm to 20 mm, or 25 mm, or 30 mm, or 40 mm, or 50 mm. In another embodiment, the outer male projection diameter, $OD_{MP}$, is from 5 mm to 50 mm, or from 5 mm to 40 mm, or from 10 mm to 30 mm, or from 15 mm to 25 mm, or from 15 mm to 20 mm. It is understood that the outer male projection diameter, $OD_{MP}$, is greater than the outer diameter, $OD_{MAW}$, which is greater than the inner diameter, $ID_{MAW}$.

In an embodiment, the distal end 76 of each male arm 76 is capable of being reversibly displaced towards the central axis, B, of the male pin 14. In an embodiment, upon the application of pressure (a force) on the male projection 84, the distal end 76 of the male arm 76 moves from an original position, $OP_M$, towards the central axis, B, to a displaced position, $DP_M$, as shown in FIG. 9B. When the pressure is removed, distal end 76 of the male arm 72 moves back to the original position, $OP_M$. The displacement distance, $DD_M$, is the distance between the original position, $OP_M$, and the displaced position, $DP_M$. In an embodiment, the displacement distance, $DD_M$, is equal to, or greater than, the male projection height, $H_{MP}$.

The male pin 14 includes an annular projection 88, as shown in FIG. 10. The annular projection 88 extends away from the central axis, B, of the male pin 14. The annular projection 88 may or may not be a continuous structure. In an embodiment, the annular projection 88 is a continuous structure extending along the circumference of the male pin 14, as shown in FIG. 10.

The annular projection 88 has an inner surface 90 and an opposing outer surface 92, as shown in FIG. 12. In an embodiment, the inner surface 90 forms a plane and, when the male pin 14 is positioned within the female pin 12, no portion of the female pin 12 extends beyond said plane.

The annular projection 88 has an outer diameter, $OD_{MAP}$, as shown in FIG. 9A. The outer diameter, $OD_{MAP}$, of the annular projection 88 is greater than the outer diameter, $OD_{MAW}$, of the second annular wall 60. The annular projection outer diameter, $OD_{MAP}$, is greater than 0 mm, or greater than 5 mm, or greater than 10 mm, or greater than 20 mm, or greater than 30 mm. In an embodiment, the annular projection outer diameter, $OD_{MAP}$, is from 5 mm, or 10 mm, or 20 mm, or 25 mm, or 30 mm to 35 mm, or 40 mm, or 50 mm, or 60 mm, or 100 mm. In a further embodiment, the annular projection outer diameter, $OD_{MAP}$, is from 5 mm to 100 mm, or from 20 mm to 100 mm, or from 20 mm to 50 mm, or from 30 mm to 50 mm, or from 30 mm to 40 mm.

In an embodiment, the male pin 14 is formed from a semi-rigid material. In an embodiment, the semi-rigid material is an acetal, or further a polyoxymethylene. In an embodiment, the male pin 14 is formed by molding, such as injection molding.

The male pin 14 may have an integral design or a composite design. In an embodiment, the male pin 14 has an integral design.

While not depicted in the drawings, it is understood that the male pin 14 may have an arrangement of male arms 72 and male projections 84 that are similar to those depicted with respect to the female pin in FIGS. 36A, 36B, and 36C. In other words, in some embodiments, the male pin 14 has a single male arm 72 with a single male projection 84 (similar to the female pin 712, 912), while in other embodiments the male pin 14 may have two male arms 72 with one male projection 84 (similar to the female pin 812).

The female pin 12 and the male in 14 may or may not be formed from the same semi-rigid material. In an embodiment, the female pin 12 and the male pin 14 each is formed from the same semi-rigid material (e.g., an acetal).

The male pin 14 may comprise two or more embodiments disclosed herein.

C. Fastener

Figure 20A:
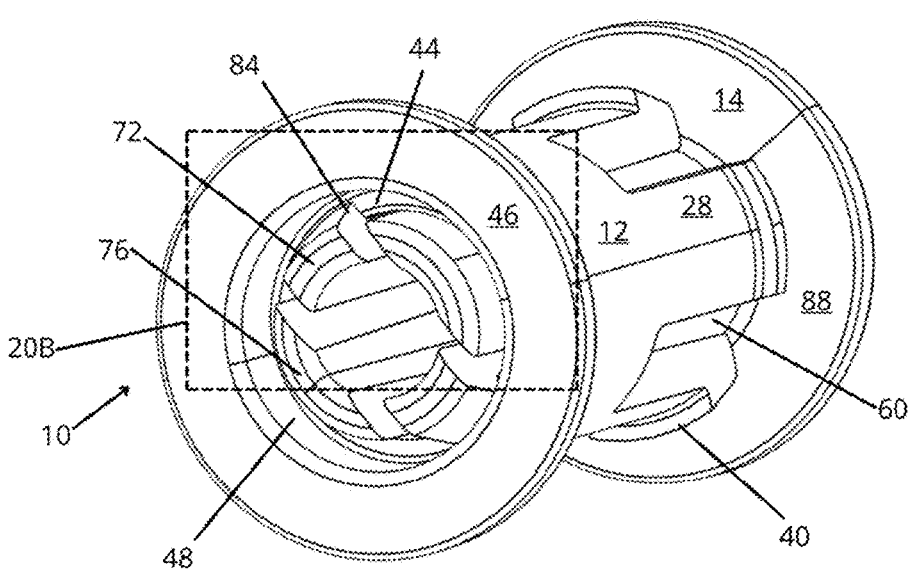
FIG. 20A is a front left perspective view a fastener in accordance with an embodiment of the present disclosure.
Figure 20B:
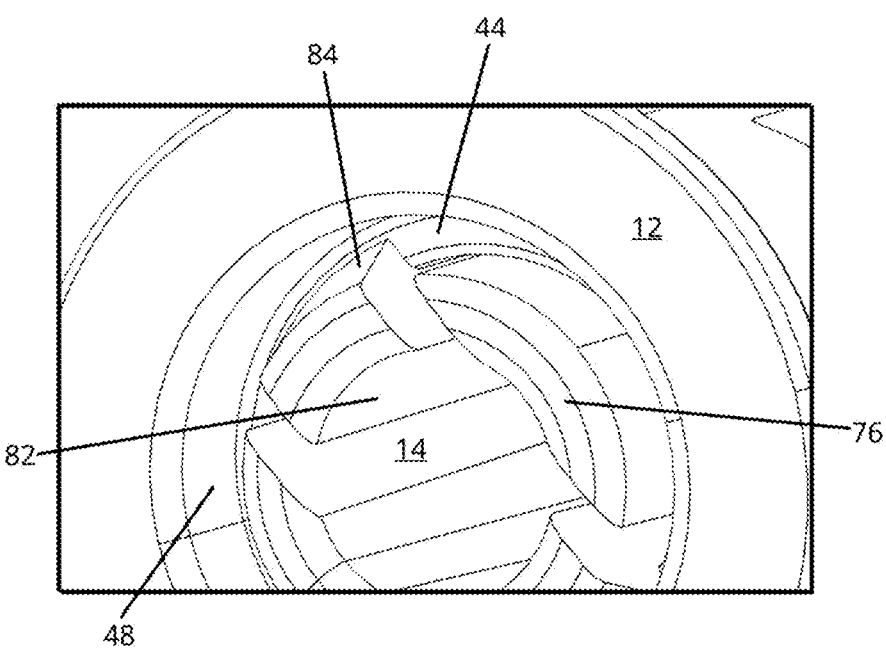
FIG. 20B is a detailed perspective view of area 20B of FIG. 20A, in accordance with an embodiment of the present disclosure.

The fastener 10 includes the female pin 12 and the male pin 14. The male pin 14 extends through the first annular wall 16 of the female pin 12, such that each male projection 84 contacts the ledge 44, as shown in FIGS. 20A and 20B. The female pin 12 and male pin 14 may be any respective female pin 12 and male pin 14 disclosed herein.

FIGS. 1, 2, and 14 to 21 depict an embodiment of the fastener 10.

Figure 21:
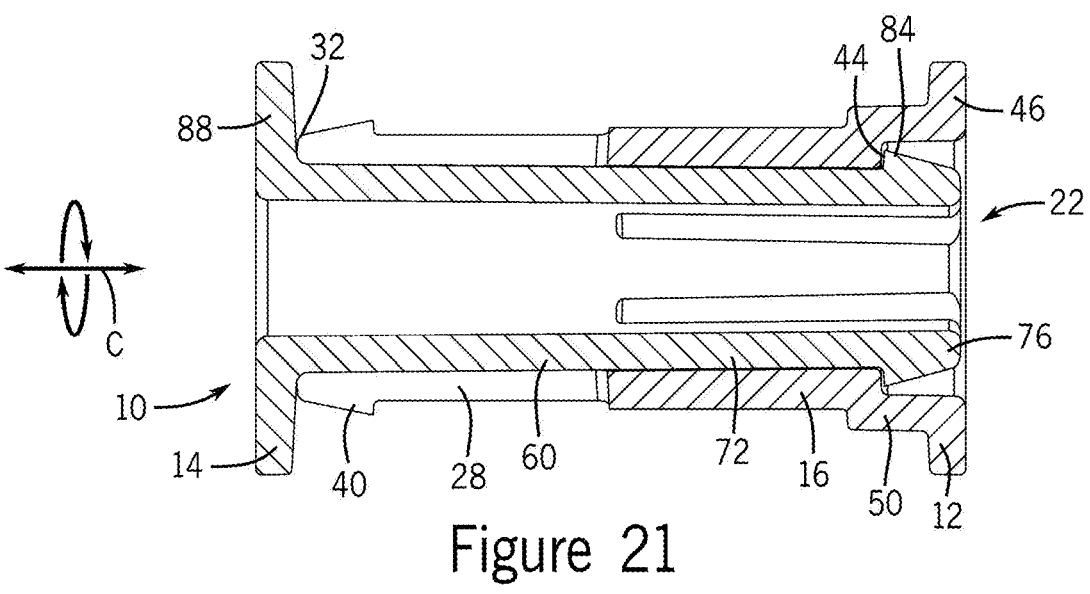
FIG. 21 is a cross-sectional view of the fastener taken along line 21-21 of FIG. 14, in accordance with an embodiment of the present disclosure.
Figure 22:
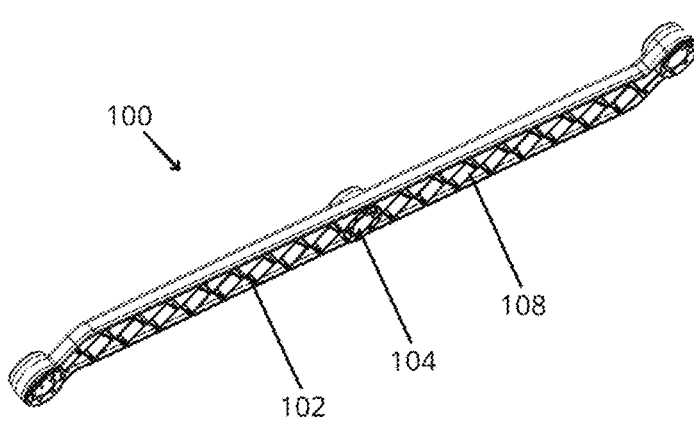
FIG. 22 is a bottom perspective view of a first article in accordance with another embodiment of the present disclosure.

In an embodiment, the outer male projection diameter, $OD_{MP}$, is greater than the first annular wall's inner diameter, $ID_{FAW}$. Thus, when the distal end 76 of each male arm 72 having a male projection 84 is passed through the first annular passageway 22 of the female pin 12, a pressure (a force) is applied to the male projection 84 by one or more of the first inner surface 26 and the female arm inner surface 38, causing the distal end 76 of the male arm 72 to be displaced towards the central axis, B, of the male pin 14, to the displaced position, $DP_M$. After the distal end 76 of each male arm 72 is passed through the first annular passageway 22 of the female pin, the pressure is released and the distal end 76 of each male arm 72 returns to the original position, $OP_M$. Upon returning to the original position, $OP_M$, each male projection 84 contacts the ledge 44 on the female pin 12. In other words, the male projection 84 catches on the ledge 44 of the female pin 12, which prevents the male pin 14 from separating from the female pin 12, as shown in FIG. 21.

In an embodiment, when the male pin 14 is positioned within the female pin 12, the central axis, A, of the female pin 12 is parallel to the central axis, B, of the male pin 14. In a further embodiment, when the male pin 14 is positioned within the female pin 12, the central axis, A, of the female pin 12 coincides with, or is aligned with, the central axis, B, of the male pin 14, to form the central axis, C, of the fastener 10, as shown in FIG. 21.

In an embodiment, the female pin 12 and the male pin 14 each is independently rotatable around the central axis, C, of the fastener 10. In another embodiment, a friction fit exists between the female pin 12 and the male pin 14, such that the female pin 12 and the male pin 14 rotate together around the central axis, C, of the fastener 10.

Figure 14:
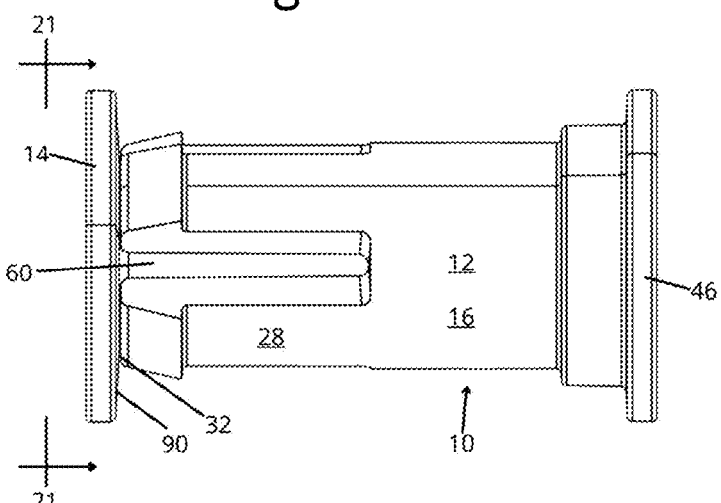
FIG. 14 is a front elevation view of a fastener in accordance with another embodiment of the present disclosure.

In an embodiment, the distal end 32 of each female arm 28 contacts the annular projection inner surface 90 of the male arm 14, as shown in FIG. 14. Not wishing to be bound by any particular theory, it is believed that the annular projection 88 of the male pin 14 protects the female arms 28 from inadvertent displacement towards the central axis, A, and from damage by external forces and the environment.

Inadvertent displacement of the female arms 28 is also prevented due to the positioning of the second annular wall 60 in the first annular passageway 22 and between opposing female arms 28, as shown in FIG. 21.

In an embodiment, the distal end 76 of each male arm 72 is positioned within the recess 48 in the female pin 12, as shown in FIG. 19. Not wishing to be bound by any particular theory, it is believed that the recess of the female pin 12 protects the male arms 72 from inadvertent displacement towards the central axis, B, and from damage by external forces and the environment.

Not wishing to be bound by any particular theory, it is believed that the present two-piece fastener 10, having a female pin 12 and a male pin 14 that each have annular walls, arms, and projections results in a fastener that is double-walled, thereby providing more strength and/or durability relative to a single-piece fastener that has a single wall.

The present fastener can be installed by a user by snapping the female pin 12 and the male pin 14 together. In other words, a user can apply a force to the outer surface 58 of the female annular projection 46, and an opposing force to the outer surface 92 of the male annular projection 88 to connect the two pins to each other. Thus, the present two-piece fastener can be installed without special equipment.

The present fastener 10 is suitable for forming a connection between at least two articles. In an embodiment, the fastener 10 is suitable for forming a rotatable connection between at least two articles.

The fastener may comprise two or more embodiments disclosed herein.

D. Method of Forming a Connection between Two Articles

The present disclosure provides a method of forming a connection between two articles. The method includes (A) providing a female pin and (B) providing a male pin. The female pin has (i) a first annular wall with a first end and a second end; (ii) at least one female arm extending from the first end of the first annular wall, the female arm having a proximal end, a distal end, a female arm outer surface, and a female projection at the distal end that extends from the female arm outer surface; and (iii) a ledge at the second end of the first annular wall. The male pin has (i) a second annular wall having a first end, a second end, and an outer diameter; (ii) at least one male arm extending from the first end of the second annular wall, the male arm having a proximal end, a distal end, a male arm outer surface, and a male projection at the distal end that extends from the male arm outer surface; and (iii) an annular projection at the second end of the second annular wall, the annular projection having an outer annular diameter that is greater than the outer diameter of the second annular wall. The method further includes (C) providing a first article having a first wall and a first opening extending through the first wall; (D) providing a second article having a second wall and a second opening extending through the second wall, the second wall having a second ledge; (E) aligning the first opening with the second opening; (F) inserting the female pin through the first opening and the second opening, such that the female projection contacts the second ledge; and (G) inserting the male pin through the first annular wall of the female pin, such that the male pin extends through the second opening and the first opening, and the male projection contacts the first ledge, thereby forming a connection between the first article and the second article.

In another embodiment, the method includes (A) providing a female pin and (B) providing a male pin. The female pin has (i) a first annular wall with a first end and a second end; (ii) at least two female arms extending from the first end of the first annular wall, each female arm having a proximal end, a distal end, and a female arm outer surface, and at least two of the female arms have a female projection at the distal end that extends from the female arm outer surface; and (iii) a ledge at the second end of the first annular wall. The male pin has (i) a second annular wall having a first end, a second end, and an outer diameter; (ii) at least two male arms extending from the first end of the second annular wall, each male arm having a proximal end, a distal end, and a male arm outer surface, and at least two of the male arms have a male projection at the distal end that extends from the male arm outer surface; and (iii) an annular projection at the second end of the second annular wall, the annular projection having an outer annular diameter that is greater than the outer diameter of the second annular wall. The method further includes (C) providing a first article having a first wall and a first opening extending through the first wall; (D) providing a second article having a second wall and a second opening extending through the second wall, the second wall having a second ledge; (E) aligning the first opening with the second opening; (F) inserting the female pin through the first opening and the second opening, such that each female projection contacts the second ledge; and (G) inserting the male pin through the first annular wall of the female pin, such that the male pin extends through the second opening and the first opening, and each male projection contacts the first ledge, thereby forming a connection between the first article and the second article.

The female pin and the male pin may be any respective female pin 12 and male pin 14 disclosed herein.

Figure 31A:
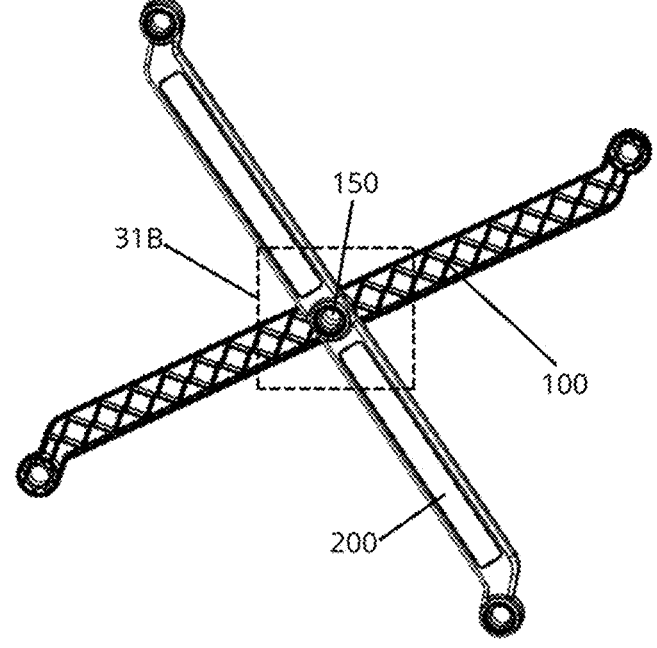
FIG. 31A is a bottom perspective view of a first article and a second article, in which the openings in the respective articles have been aligned, in accordance with an embodiment of the present disclosure.
Figure 31B:
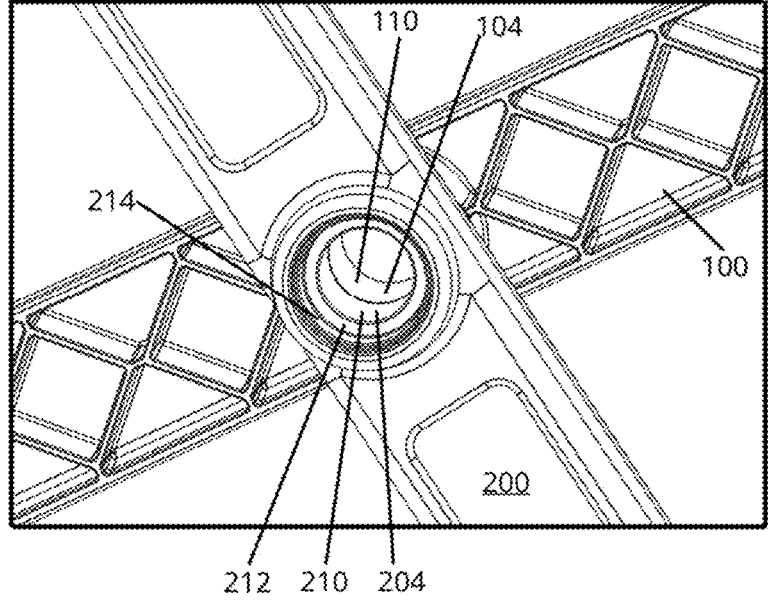
FIG. 31B is a detailed perspective view of area 31B of FIG. 31A, in accordance with an embodiment of the present disclosure.

FIGS. 22 to 28B depict an embodiment of a first article 100. It is understood that the second article 200 may or may not have an identical structure as the first article 100. For purposes of the present disclosure, the following description of the articles (100, 200) shall apply to both the first article 100 and the second article 200 (not shown in FIGS. 22 to 28B) as identical structures. FIGS. 31A and 31B depict the first article 100 and the second article 200.

Figures 23, 24, 25A:
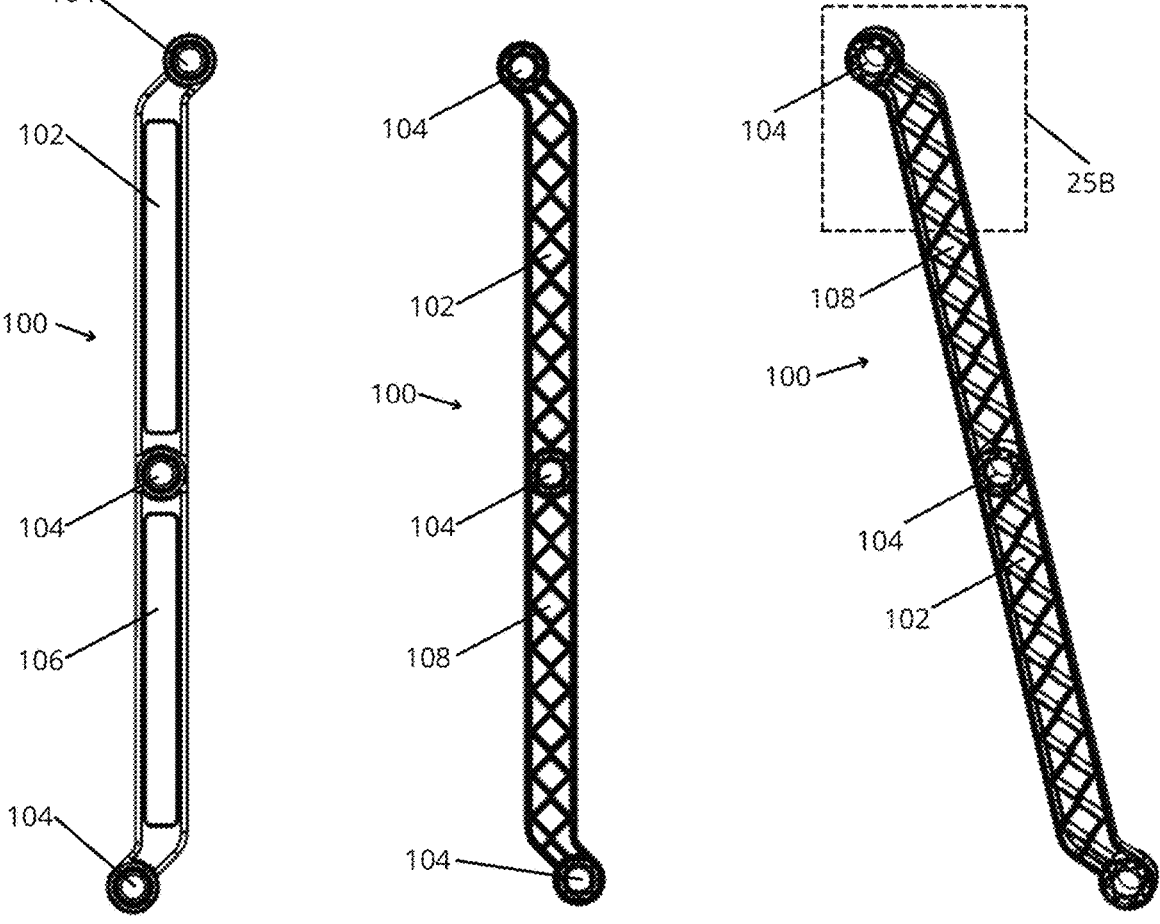
FIG. 23 is a top plan view of a first article in accordance with an embodiment of the present disclosure.
FIG. 24 is a bottom plan view of a first article in accordance with an embodiment of the present disclosure.
FIG. 25A is a right bottom perspective view of a first article in accordance with an embodiment of the present disclosure.

The article (100, 200) has a wall (102, 202) and an opening (104, 204) extending through the wall (102, 202). The opening (104, 204) is a void. The article (100, 200) has at least one opening (104, 204). In an embodiment, the article (100, 200) includes a plurality of openings (104, 204). FIGS. 23 and 24 depict a first article 100 with three openings 104.

In an embodiment, the wall (102, 202) has a top surface (106, 206) and an opposing bottom surface (108, 208), as shown in FIGS. 27 and 28A. The opening (104, 204) extends through the wall (102, 202) from the top surface (106, 206) to the bottom surface (108, 208).

Figure 25B:
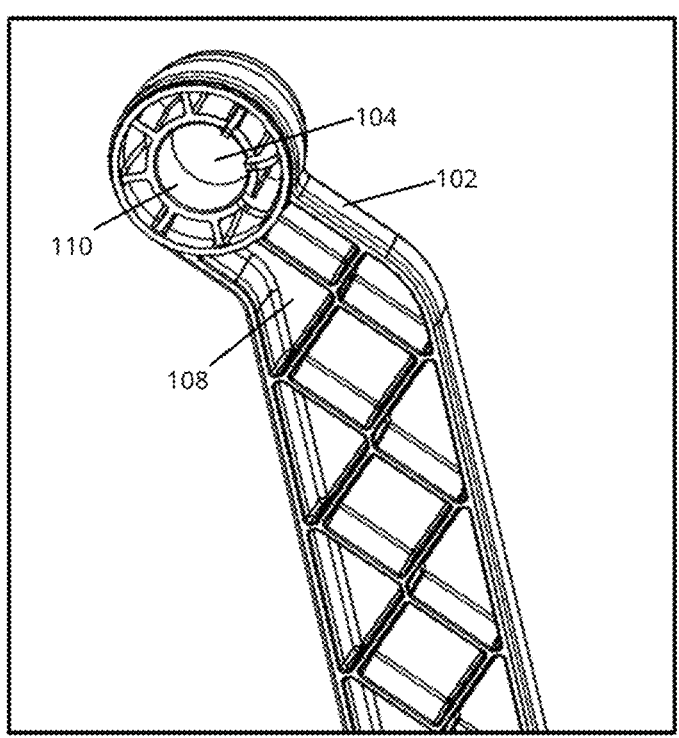
FIG. 25B is a detailed perspective view of area 25B of FIG. 25A, in accordance with an embodiment of the present disclosure.
Figure 26A:
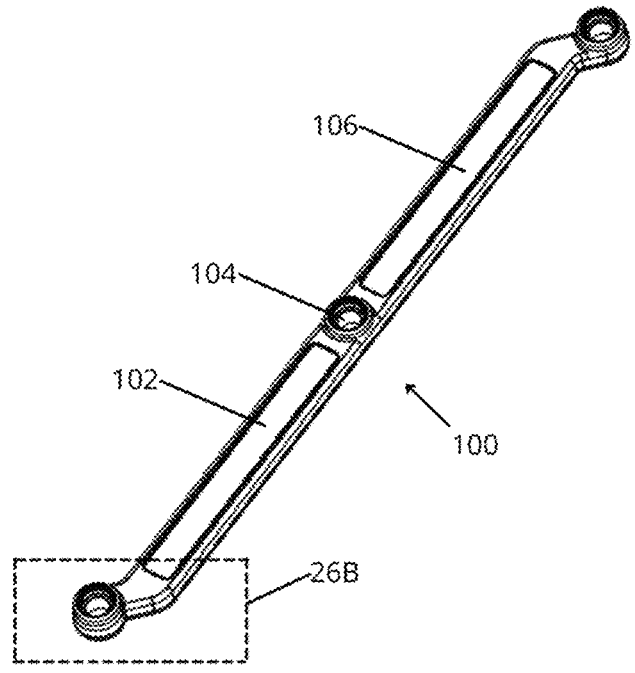
FIG. 26A is a top perspective view of a first article in accordance with an embodiment of the present disclosure.
Figures 28B, 29A:
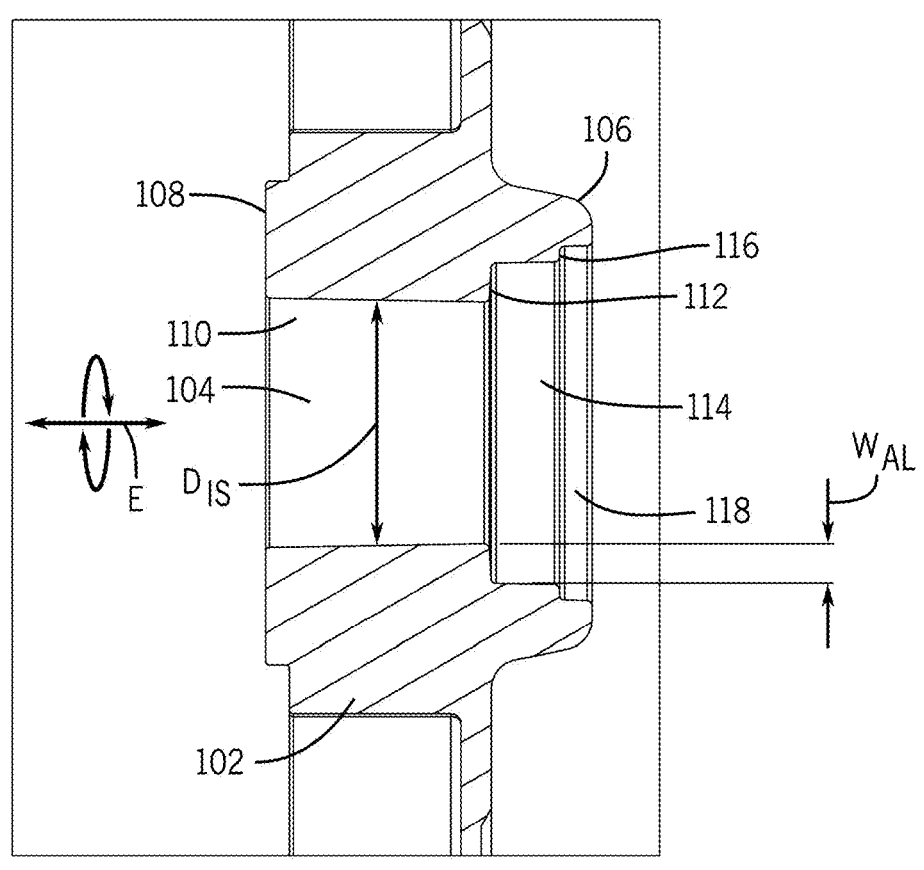
FIG. 28B is a cross-sectional view of area 28C of FIG. 28A, taken along line 28B-28B of FIG. 28A, in accordance with an embodiment of the present disclosure.
FIG. 29A is a top perspective view of a first article, a second article, a third article, and a fourth article arranged in a lattice pattern, in accordance with an embodiment of the present disclosure.
Figure 29B:
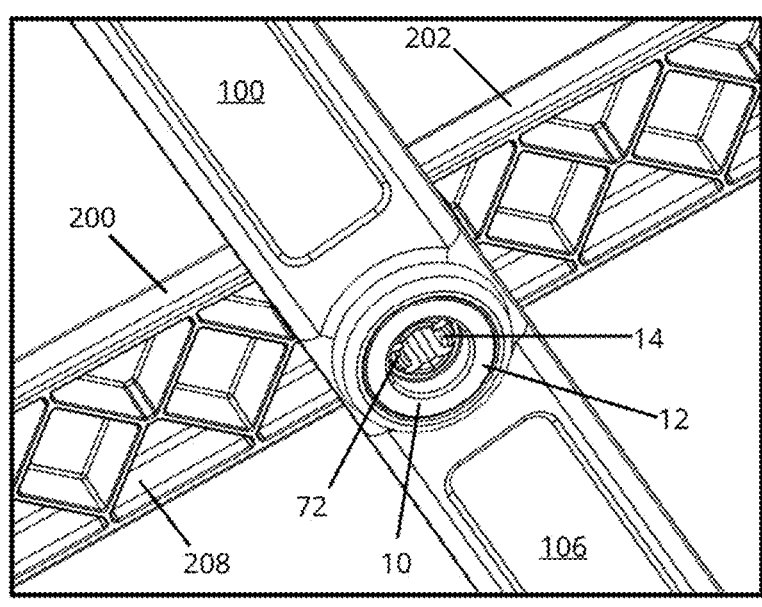
FIG. 29B is a detailed perspective view of area 29B of FIG. 29A, in accordance with an embodiment of the present disclosure.

In an embodiment, the opening (104, 204) has an interior surface (110, 210), as shown in FIGS. 25B and 28B. The interior surface (110, 210) defines the opening (104, 204). In an embodiment, the interior surface (110, 210) has a diameter, $D_{IS}$, as shown in FIG. 28B. The diameter, $D_{IS}$, is greater than 0 mm, or greater than 5 mm, or greater than 10 mm, or greater than 15 mm, or greater than 20 mm. In an embodiment, the diameter, $D_{IS}$, is from 5 mm, or 10 mm, or 15 mm, or 20 mm to 25 mm, or 30 mm, or 40 mm, or 50 mm, or 60 mm, or 80 mm. In a further embodiment, the diameter, $D_{IS}$, from 5 mm to 80 mm, or from 10 mm to 50 mm, or from 10 mm to 40 mm, or from 15 mm to 30 mm, or from 20 mm to 30 mm, or from 20 mm to 25 mm.

In an embodiment, the opening (104, 204) has a central axis, E, as shown in FIG. 28B. The central axis, E, extends through the opening (104, 204).

In an embodiment, the article (100, 200) includes a second ledge (112, 212), as shown in FIG. 28B. The second ledge (112, 212) surrounds, or substantially surrounds, the opening (104, 204). The second ledge (112, 212) may be proximate to or coextensive with the top surface (106, 206). The second ledge (112, 212) is an annular surface extending perpendicular, or substantially perpendicular, to the central axis, E. In an embodiment, the second ledge (112, 212) extends parallel, or substantially parallel, to one or more of the top surface (106, 206) and the bottom surface (108, 208).

In an embodiment, the second ledge (112, 212) has a width, $W_{AL}$, as shown in FIG. 28B. The second ledge width, $W_{AL}$, is greater than 0 mm, or greater than 1.0 mm, or greater than 2.0 mm. In an embodiment, the second ledge width, $W_{AL}$, is from 1.0 mm, or 1.5 mm, or 2.0 mm, or 2.5 mm to 3.0 mm, or 5.0 mm, or 10 mm, or 20 mm. In a further embodiment, the second ledge width, $W_{AL}$, is from 0.5 mm to 20 mm, or from 1 mm to 5 mm, or from 1.5 mm to 3 mm, or from 2 mm to 3 mm.

In an embodiment, the second ledge width, $W_{AL}$, is greater than, or equal to, the female projection height, $H_{FP}$.

In an embodiment, a second recess (114, 214) exists between the second ledge (112, 212) and top surface (106, 206), as shown in FIG. 28B. The second recess (114, 214) is a void configured to receive one or more of (i) the distal end 32 of the female arms 28, (ii) the annular projection 88 of the male pin 14, and (iii) the annular projection 46 of the female pin 12. In a further embodiment, the second recess (114, 214) is a void configured to receive the distal end 32 of the female arms 28.

In an embodiment, the article (100, 200) includes a third ledge (116, 216), as shown in FIG. 28B. The third ledge (116, 216) surrounds, or substantially surrounds, the second recess (114, 214). The third ledge (116, 216) may be proximate to or coextensive with the top surface (106, 206). The third ledge (116, 216) is an annular surface extending perpendicular, or substantially perpendicular, to the central axis, E. In an embodiment, the third ledge (116, 216) extends parallel, or substantially parallel, to one or more of the top surface (106, 206), the bottom surface (108, 208), and the second ledge (112, 212).

In an embodiment, a third recess (118, 218) exists between the third ledge (116, 216) and the top surface (106, 206), as shown in FIG. 28B. The third recess (118, 218) is a void configured to receive one or more of (i) the annular projection 88 of the male pin 14, and (ii) the annular projection 46 of the female pin 12.

Figure 33:
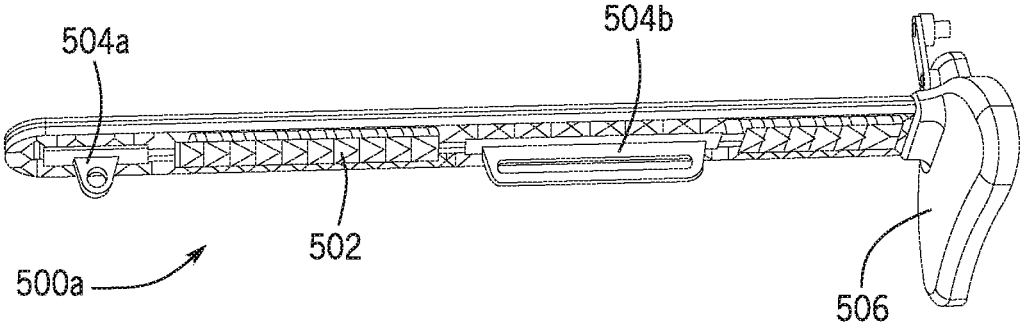
FIG. 33 is a front perspective view of a post in accordance with another embodiment of the present disclosure.
Figure 34:
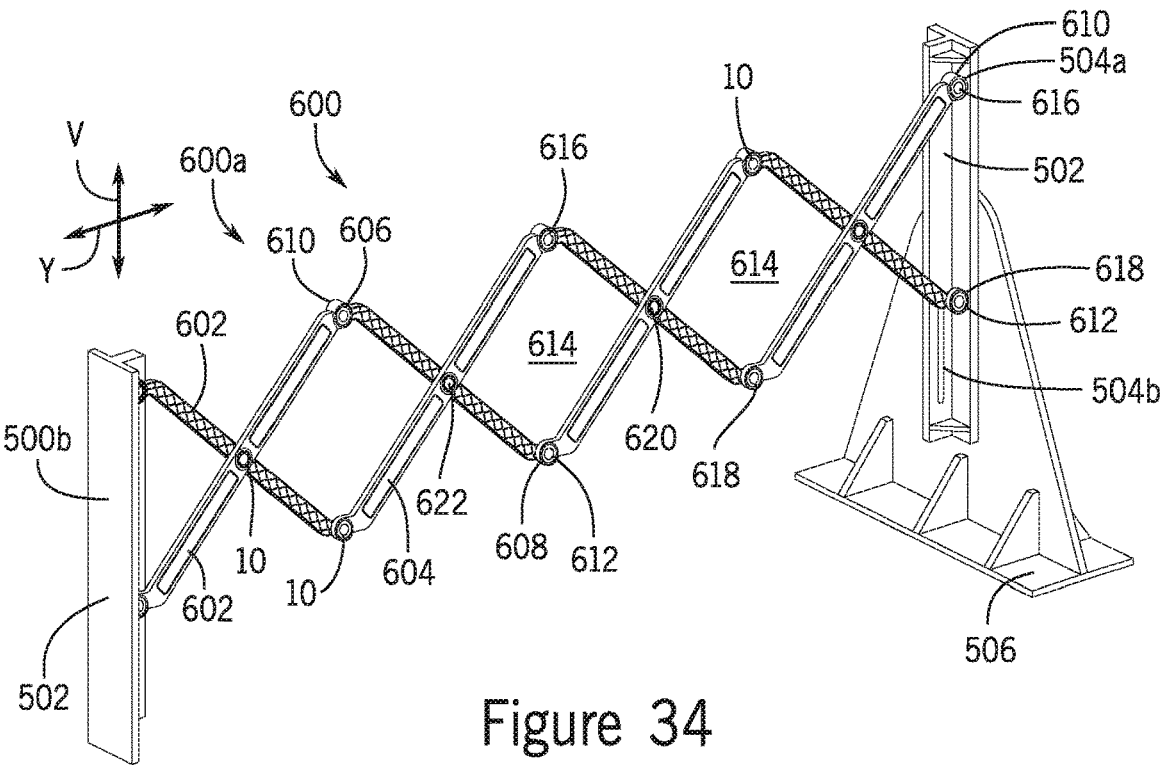
FIG. 34 is a front perspective view of an expandable barrier in accordance with another embodiment of the present disclosure.
Figure 35:
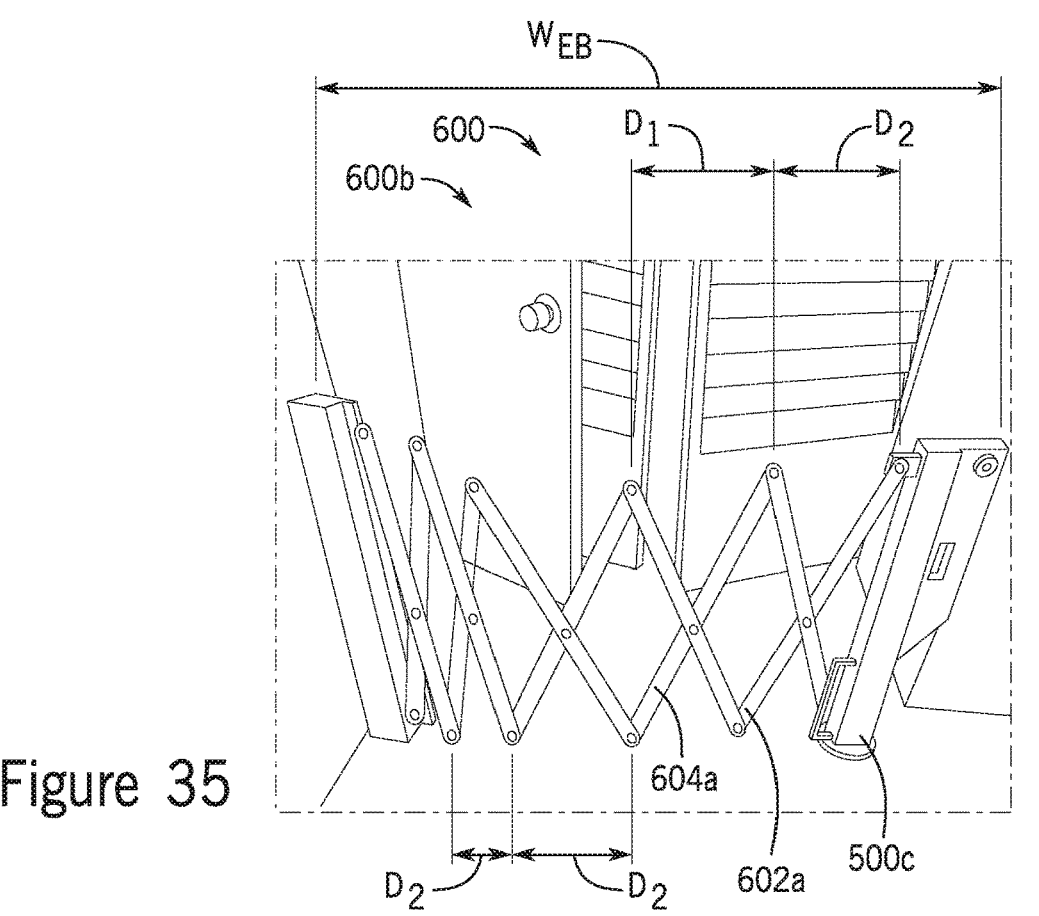
FIG. 35 is a front perspective view of an expandable barrier in accordance with another embodiment of the present disclosure.

In an embodiment, one or more of the first article 100 and the second article 200 is an elongate article. Nonlimiting examples of suitable elongate articles are barrier arms. FIGS. 22 to 28B depict a nonlimiting example of a suitable barrier arm. In another embodiment, one of the first article 100 and the second article 200 is a post and the other article is a barrier arm. FIGS. 33, 34, and 35 depict nonlimiting examples of suitable posts (500a, 500b, 500c).

Figure 32A:
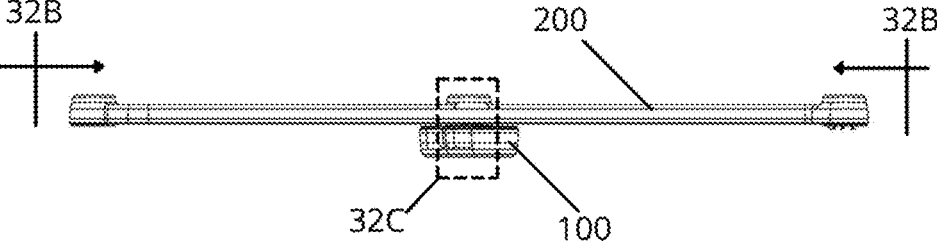
FIG. 32A is a left side elevation view of a first article and a second article that have been rotationally connected to each other, in accordance with an embodiment of the present disclosure.
Figure 32B:
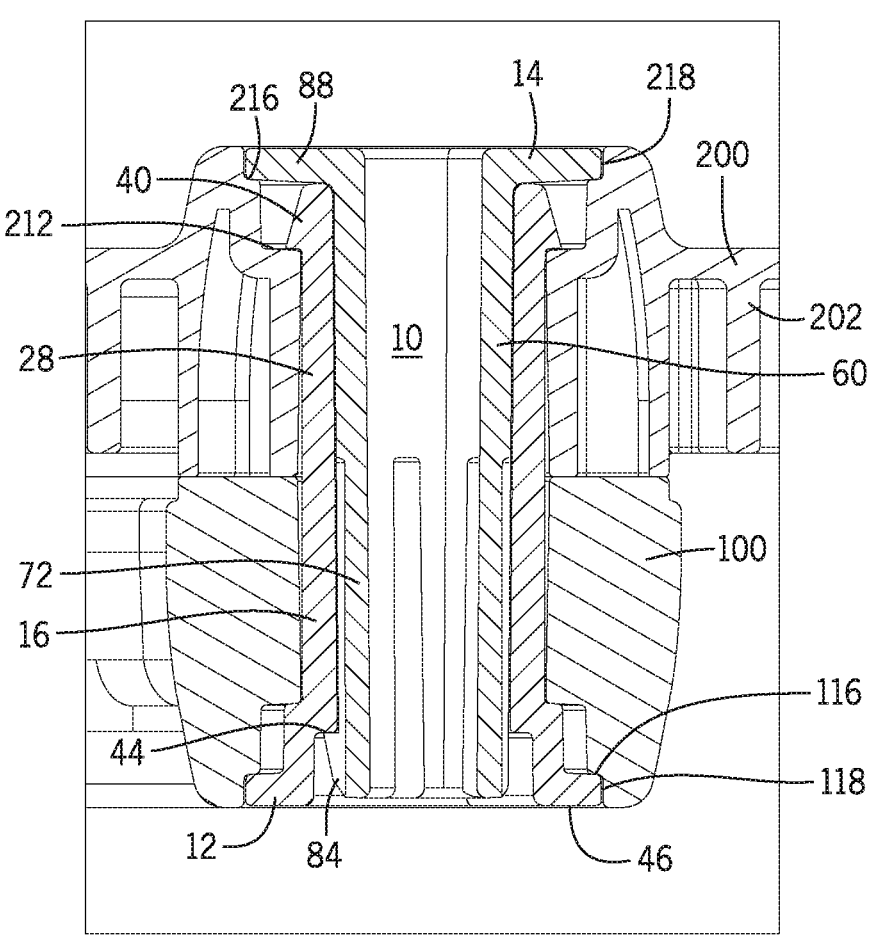
FIG. 32B is a cross-sectional view of area 32C of FIG. 32A, taken along line 32B-32B of FIG. 32A, in accordance with an embodiment of the present disclosure.

The method includes aligning the first opening 104 with the second opening 204. FIGS. 31A and 31B depict a first article 100 and a second article 200, wherein the first opening 104 is aligned with the second opening 204. When the first opening 104 aligns with the second opening 204, the first article's interior surface 110 is coextensive with, or substantially coextensive with, the second article's interior surface 210. The alignment forms a fastener passageway 150 through which a fastener 10 can be positioned, as shown in FIG. 32B.

In an embodiment, when the first opening 104 is aligned with the second opening 204, the bottom surface 108 of the first article 100 contacts the bottom surface 208 of the second article 200.

The method includes inserting the female pin 12 through the first opening 104 and the second opening 204, such that each female projection 40 contacts the second ledge 212. In other words, the female pin 12 is inserted through the fastener passageway 150, wherein the distal ends 32 of the female arms 28 are first passed through the first opening 104, and are second passed through the second opening 204.

In an embodiment, the diameter of the interior surface, Dig, of the first opening 104 and the second opening 204 are the same, and the diameter of the interior surface, $D_{IS}$, is less than the outer female projection diameter, $OD_{FP}$. Thus, when the distal end 32 of each female arm 28 having a female projection 40 is passed through the fastener passageway 150, a pressure (a force) is applied to the female projection 40 by one or more of the first article's interior surface 110 and second article's interior surface 210, causing the distal end 32 of the female arm 28 to be displaced towards the central axis, A, of the female pin 12, to the displaced position, $DP_F$. After the distal end 32 of each female arm 28 is passed through the fastener passageway 150, the pressure is released and the distal end 32 of each female arm 28 returns to the original position, $OP_F$. Upon returning to the original position, $OP_F$, each female projection 40 contacts the second ledge 212 on the second article 200. In other words, the female projection 40 catches on the second ledge 212 of the second article 200, which prevents the female pin 12 from separating from the second article 200, as shown in FIG. 32B. In a further embodiment, when each female projection 40 contacts the second ledge 212 on the second article 200, the annular projection 40 of the female pin 12 contacts the third ledge 116 of the first article 100, which prevents the female pin 12 from separating from the first article 100, as shown in FIG. 32B.

The method further includes inserting the male pin 14 through the first annular wall 16 of the female pin 12, such that the male pin 14 extends through the second opening 204 and the first opening 104, and each male projection 84 contacts the first ledge 44, thereby forming a connection between the first article 100 and the second article 200. In an embodiment, the outer male projection diameter, $OD_{MP}$, is greater than the first annular wall's inner diameter, $ID_{FAW}$. Thus, when the distal end 76 of each male arm 72 having a male projection 84 is passed through the first annular passageway 22 of the female pin 12, a pressure (a force) is applied to the male projection 84 by one or more of the first inner surface 26 and the female arm inner surface 38, causing the distal end 76 of the male arm 72 to be displaced towards the central axis, B, of the male pin 14, to the displaced position, $DP_M$. After the distal end 76 of each male arm 72 is passed through the first annular passageway 22 of the female pin, the pressure is released and the distal end 76 of each male arm 72 returns to the original position, $OP_M$. Upon returning to the original position, $OP_M$, each male projection 84 contacts the ledge 44 on the female pin 12. In other words, the male projection 84 catches on the ledge 44 of the female pin 12, which prevents the male pin 14 from separating from the female pin 12, as shown in FIG. 32B. In a further embodiment, when each male projection 84 contacts the first ledge 44, the annular projection 88 of the male pin 14 contacts the third ledge 216 of the second article 200, which prevents the male pin 14 from separating from the second article 200, as shown in FIG. 32B.

FIGS. 29A to 32B depict a first article 100 that is connected to a second article 200 via a fastener 10. In an embodiment, the method includes forming a rotatable connection between the first article 100 and the second article 200, whereby the first article 100 and the second article 200 are independently rotatable relative to one or more of (i) the central axis, A, of the female pin 12; (ii) the central axis, B, of the male pin 14; (iii) the central axis, C, of the fastener 10; and (iv) the central axis, E, of the opening (104, 204). As used herein, "independently rotatable" refers to a connection configuration in which the rotation of one of two connected articles is separate, or independent, from the rotation of the other article. In other words, one article may be rotated about an axis while the other article remains in a fixed position, the articles may rotate in the same direction about the axis at the same or different speeds, and/or the articles may rotate in opposite directions about the axis at the same or different speeds.

In an embodiment, each of (i) the central axis, A, of the female pin 12; (ii) the central axis, B, of the male pin 14; (iii) the central axis, C, of the fastener 10; and (iv) the central axis, E, of the opening (104, 204) is parallel, or is substantially parallel. In a further embodiment, each of (i) the central axis, A, of the female pin 12; (ii) the central axis, B, of the male pin 14; (iii) the central axis, C, of the fastener 10; and (iv) the central axis, E, of the opening (104, 204) coincides with one another.

Figure 30A:
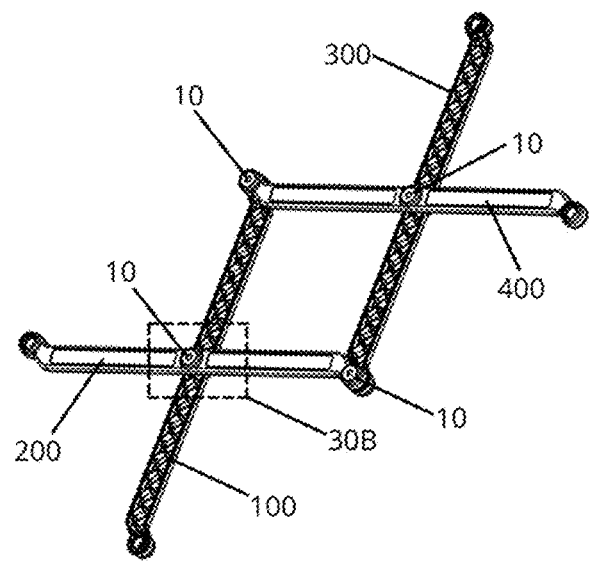
FIG. 30A is a bottom perspective view of a first article, a second article, a third article, and a fourth article arranged in a lattice pattern, in accordance with an embodiment of the present disclosure.
Figure 30B:
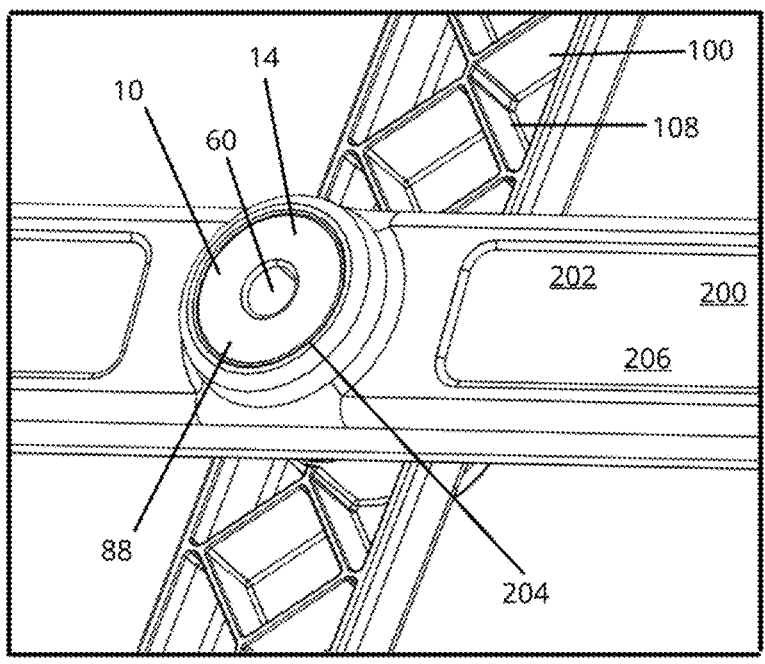
FIG. 30B is a detailed perspective view of area 30B of FIG. 30A, in accordance with an embodiment of the present disclosure.

FIGS. 29A and 30A further depict a third article 300 and a fourth article 400. The third article is rotatably connected to the second article 200 via a fastener 10. The fourth article 400 is rotatably connected to the first article 100 via a fastener. The third article 300 and the fourth article 400 are rotatably connected via a fastener 10. It is understood that the third article 300 and the fourth article 400 may have the same structure or a different structure relative to the first article 100 and the second article 200.

The article (100, 200, 300, 400) may be formed from a rigid or semi-rigid material. Nonlimiting examples of suitable materials include polymer-based materials, wood, metal, and combinations thereof. Nonlimiting examples of suitable polymer-based materials include propylene-based polymer (such as polypropylene), polyamides (such as nylon), ethylene-based polymer (such as high density polyethylene), and combinations thereof. The polymer-based material may or may not include an additive, such as a filler, a flame retardant, a surfactant, a UV-absorber, or a combination thereof. In an embodiment, the polymer-based material includes a filler. Nonlimiting examples of suitable filler include glass fiber, talc, and combinations thereof. In an embodiment, the article (100, 200, 300, 400) is formed from a polymer-based material including nylon and a glass fiber filler, such as EnXL PA6+30% GF, available from Shenzhen Enxinlong Special Engineering Plastics Co., Ltd. Nonlimiting examples of suitable metals include aluminum, steel, and combinations thereof. The article (100, 200, 300, 400) may be formed by conventional methods such as molding (such as injection molding or blow molding), cutting and drilling, and Computer Numerical Control (CNC) machining. The article (100, 200, 300, 400) may have an integral design or a composite design. In an embodiment, the article (100, 200, 300, 400) has an integral design.

The method may comprise two or more embodiments disclosed herein.

E. Expandable Barrier

The present disclosure provides an expandable barrier. The expandable barrier includes (A) a plurality of fasteners; (B) at least two posts, each post having a post wall and at least two post openings extending through the post wall; and (C) a plurality of elongate articles. The fasteners may be any fastener 10 disclosed herein. Each elongate article has an article wall, a first article opening extending through the article wall at a first end of the article, and a second article opening extending through the article wall at a second end of the article, the elongate articles arranged in a lattice pattern between the two posts such that (i) each of the first article openings is aligned with one of (a) the post openings or (b) the first article opening of a different article, and one of the fasteners extends therethrough and forms a first rotatable connection; and (ii) each of the second article openings is aligned with one of (a) the post openings or (b) the second article opening of a different article, and one of the fasteners extends therethrough and forms a second rotatable connection.

As used herein, an "expandable barrier" is a gate or fence with at least two posts connected to opposing ends of a plurality of elongate articles arranged in a lattice pattern, whereby a distance between the two posts can be lengthened or shortened.

FIG. 34 depicts an embodiment of an expandable barrier 600*a*. The expandable barrier 600*a* includes two posts 500*b*. Each post 500*b* has a post wall 502 and at least two post openings 504 extending through the post wall 502. In an embodiment, the post 500*b* has a top post opening 504*a* and a bottom post opening 504*b*, as shown in FIG. 34. In a further embodiment, at least one of the top post opening 504*a* and the bottom post opening 504*b* has an oval shape. FIG. 34 shows a bottom post opening 504*b* with an oval shape.

In an embodiment, the two posts 500*b* are arranged such that they each extend parallel with respect to each other along a vertical axis, V, as shown in FIG. 34.

In an embodiment, one or more of the posts 500*b* includes a base 506. The base 506 is configured to enable the post 500*b* to be placed upright (i.e., with the posts extending along the vertical axis, V) on a surface, such as a floor, a road, a walkway, or a table. The base 506 may have an integral or composite design with the post wall 502. FIG. 33 depicts an embodiment of a post 500*a* in which the post wall 502 is integral with the base 506. FIG. 34 depicts an embodiment of a post 500*b* in which the post wall 502 and the base 506 are composite components that have been assembled to form the post 500*b*. In a further embodiment, the base 506 is equipped with one or more wheels, positioned to contact the surface on which the post 500*b* is placed.

In an embodiment, one or more of the posts 500*b* is configured to be connected to a structure, such as doorway, a wall, or a rack. Nonlimiting examples of suitable methods of connecting a post 500*b* to a structure include screws, bolts, nails, fasteners 10, zip ties, straps, adhesive, hook and eye, hook and loop, and combinations thereof.

The post (500*a*, 500*b*, 500*c*) may be formed from a rigid or semi-rigid material, and may be formed from conventional methods such as molding (such as injection molding or blow molding), cutting and drilling, and CNC machining. The post (500*a*, 500*b*, 500*c*) may have an integral design or a composite design.

The expandable barrier 600 includes at least two posts (500*a*, 500*b*, 500*c*). In an embodiment, the expandable barrier 600 includes two, and only two posts (500*a*, 500*b*, 500*c*). In another embodiment, the expandable barrier 600 includes three, or more than three, posts (500*a*, 500*b*, 500*c*).

The expandable barrier 600 includes a plurality of elongate articles 602. In an embodiment, the expandable barrier

600 includes at least two, or at least four, or at least six, or at least eight, or at least ten elongate articles 602. FIG. 34 depicts an expandable barrier 600*a* with eight elongate articles 602. FIG. 35 depicts an expandable barrier 600*b* with ten elongate articles 602*a*. The elongate articles (602, 602*a*) may be any first, second, third, or fourth articles (100, 200, 300, 400) disclosed herein.

Each elongate article (602, 602*a*) has an article wall (604, 604*a*) and two opposing ends—a first end 606 and a second end 608. An "elongate article" is a structure having a length and a width, wherein the length is greater than the width. Nonlimiting examples of suitable elongate articles (602, 602*a*) are shown in FIGS. 34 and 35.

Each elongate article (602, 602*a*) has a first article opening 610 extending through the article wall (604, 604*a*) at the first end 606 of the article, and a second article 612 opening extending through the article wall (604, 604*a*) at the second end 608 of the elongate article (602, 602*a*). The elongate article (602, 602*a*) may be any article (100, 200, 300, 400) described herein. The elongate article wall (604, 604*a*) may be any article wall (102, 202) described herein. The first article opening 610 and the second article opening 612 may be any opening (104, 204) disclosed herein. It is understood that the elongate article (602, 602*a*) may include additional openings (such as a third article opening 620) positioned between the first article opening 610 and the second article opening 612, and each of these additional openings extends through the article wall (604, 604*a*) and may be any opening (104, 204) disclosed herein.

The elongate articles (602, 602*a*) are arranged in a lattice pattern between the two posts (500*a*, 500*b*, 500*c*). As used herein, a "lattice pattern" is a configuration of elongate articles crossed and fastened to each other with square-, diamond-, or rectangle-shaped voids, or spaces, positioned between the elongate articles. FIG. 34 depicts elongate articles 602 arranged in a lattice pattern, with rectangle-shaped voids 614 positioned between the elongate articles 602.

In an embodiment, the elongate articles (602, 602*a*) are arranged in a lattice pattern between the two posts (500*a*, 500*b*, 500*c*) such that (i) each of the first article openings 610 is aligned with one of (a) the post openings 504 or (b) the first article opening 610 of a different article (602, 602*a*), and one of the fasteners 10 extends therethrough and forms a first rotatable connection 616; and (ii) each of the second article openings 612 is aligned with one of (a) the post openings 504 or (b) the second article opening 612 of a different article (602, 602*a*), and one of the fasteners 10 extends therethrough and forms a second rotatable connection 618. In a further embodiment, the elongate articles (602, 602*a*) are arranged in a lattice pattern between the two posts (500*a*, 500*b*, 500*c*) such that (i) each of the first article openings 610 is aligned with one of (a) the top post openings 504*a* or (b) the first article opening 610 of a different article (602, 602*a*), and one of the fasteners 10 extends therethrough and forms a first rotatable connection 616; and (ii) each of the second article openings 612 is aligned with one of (a) the bottom post openings 504*b* or (b) the second article opening 612 of a different article (602, 602*a*), and one of the fasteners 10 extends therethrough and forms a second rotatable connection 618.

In an embodiment, each of the two posts (500*a*, 500*b*, 500*c*) is rotatably connected to at least two elongate articles (602, 602*a*). FIG. 34 depicts two posts 500*b* and each post has a first rotatable connection 616 at the top post opening 504*a* with an elongate article 602, and a second rotatable connection 618 at the bottom post opening 504b with a different elongate article 602.

In an embodiment, each of the elongate articles (602, 602a) includes a third article opening 620 extending through the article wall (604, 604a) at a position between the first article opening 610 and the second article opening 612, as shown in FIG. 34. In a further embodiment, the third article opening 620 is positioned equidistant between the first article opening 610 and the second article opening 612. In an embodiment, each third article opening 620 is aligned with the third article opening 620 of a different article (602, 602a), and one of the fasteners 10 extends therethrough and forms a third rotatable connection 622.

In an embodiment, the two posts (500a, 500b, 500c) are arranged such that they each extend parallel with respect to each other along the vertical axis, V, and the two posts are movable with respect to each other along an expanding axis, Y, that is perpendicular to the vertical axis, V, as shown in FIG. 34. In other words, the expandable barrier 600 is capable of moving between a deployed state (shown in FIG. 34) and a stored state (not shown). When the expandable barrier 600 is positioned in the "deployed state," each first connection distance, $D_1$, is at a maximum distance and each second connection distance, $D_2$, is at a maximum distance, as shown in FIG. 34. The first connection distance, $D_1$, is the distance between any two successive first rotatable connections 616, taken along the expanding axis, Y. The second connection distance, $D_2$, is the distance between any two successive second rotatable connections 618, taken along the expanding axis, Y.

When the expandable barrier 600 is positioned in the "stored state," each first connection distance, $D_1$, is at a minimum distance and each second connection distance, $D_2$, is at a minimum distance. FIG. 35 depicts an expandable barrier 600 that is between the deployed state and the stored state. As shown in FIG. 35, not every first connection distance, $D_1$, is at a maximum distance and not every second connection distance, $D_2$, is at a maximum distance.

In an embodiment, the expandable barrier 600 has a width, WEB, as shown in FIG. 35. The width, WEB, of the expandable barrier 600 is at its maximum value when the expandable barrier 600 is positioned in the deployed state, and is at is minimum value when the expandable barrier 600 is positioned in the stored state. In an embodiment, when positioned in the deployed state, the width, WEB, of the expandable barrier 600 is greater than 40 cm, or greater than 50 cm, or greater than 100 cm, or greater than 150 cm, or greater than 200 cm, or greater than 300 cm. In a further embodiment, when positioned in the deployed state, the width, WEB, of the expandable barrier 600 is from 40 cm, or 50 cm to 100 cm, or 150 cm, or 200 cm, or 300 cm, or 500 cm. In another embodiment, when positioned in the deployed state, the width, WEB, of the expandable barrier 600 is from 40 cm to 500 cm, or from 50 cm to 300 cm. In an embodiment, when positioned in the stored state, the width, WEB, of the expandable barrier 600 is less than 300 cm, or less than 200 cm, or less than 150 cm, or less than 100 cm, or less than 50 cm, or less than 40 cm, or less than 35 cm. In another embodiment, when positioned in the stored state, the width, WEB, of the expandable barrier 600 is from 5 cm, or 10 cm, or 15 cm, or 20 cm, or 30 cm to 35 cm, or 40 cm, or 50 cm, or 100 cm, or 150 cm, or 200 cm, or less than 500 cm. In a further embodiment, when positioned in the stored state, the width, WEB, of the expandable barrier 600 is from 5 cm to less than 500 cm, or from 5 cm to less than 300 cm, or from 5 cm to less than 150 cm, or from 5 cm to less than 100 cm, or from 5 cm to less than 50 cm, or from 5 cm to less than 40 cm, or from 5 cm to 38 cm, or from 5 cm to 35 cm, or from 10 cm to 35 cm.

In an embodiment, one or more of the posts (500a, 500b, 500c) and/or one or more of the elongate articles (602) may include a reflective material (such as a reflective tape, fabric, or paint) or a flag, to enhance the visibility of the expandable barrier 600.

In an embodiment, a sign (such as a caution sign) may be affixed to the expandable barrier 600.

Nonlimiting examples of suitable expandable barriers 600 include child gates, pet gates, road blocks, pedestrian barriers, caution barriers, and industrial gates.

The expandable barrier may comprise two or more embodiments disclosed herein.

F. Specific Embodiments

In an embodiment, a fastener 10 is provided. The fastener 10 includes (A) a female pin 12 and (B) a male pin 14. The (A) female pin 12 includes (i) a first annular wall 16 having a first end 18 and a second end 20; (ii) at least one female arm 28 extending from the first end 18 of the first annular wall 16, the female arm 28 having a proximal end 30, a distal end 32, a female arm outer surface 36, and a female projection 40 at the distal end 32 that extends from the female arm outer surface 36; and (iii) a ledge 44 at the second end 20 of the first annular wall 16. The (B) male pin 14 includes (i) a second annular wall 60 having a first end 62, a second end 64, and an outer diameter, $OD_{MAW}$; at least one male arm 72 extending from the first end 62 of the second annular wall 60, the male arm 72 having a proximal end 74, a distal end 76, a male arm outer surface 80, and a male projection 84 at the distal end 76 that extends from the male arm outer surface 80; and (iii) an annular projection 88 at the second end 64 of the second annular wall 60, the annular projection 88 having an outer annular diameter, $OD_{MAP}$, that is greater than the outer diameter of the second annular wall, $OD_{MAW}$. The male pin 14 extends through the first annular wall 16 of the female pin 12, such that the male projection 84 contacts the ledge 44.

In another embodiment, the (A) female pin 12 includes (i) a first annular wall 16 having a first end 18 and a second end 20; (ii) at least two female arms 28 extending from the first end 18 of the first annular wall 16, each female arm 28 having a proximal end 30, a distal end 32, and a female arm outer surface 36, and at least two of the female arms 28 have a female projection 40 at the distal end 32 that extends from the female arm outer surface 36; and (iii) a ledge 44 at the second end 20 of the first annular wall 16. The (B) male pin 14 includes (i) a second annular wall 60 having a first end 62, a second end 64, and an outer diameter, $OD_{MAW}$; at least two male arms 72 extending from the first end 62 of the second annular wall 60, each male arm 72 having a proximal end 74, a distal end 76, and a male arm outer surface 80, and at least two of the male arms 72 have a male projection 84 at the distal end 76 that extends from the male arm outer surface 80; and (iii) an annular projection 88 at the second end 64 of the second annular wall 60, the annular projection 88 having an outer annular diameter, $OD_{MAP}$, that is greater than the outer diameter of the second annular wall, $OD_{MAW}$. The male pin 14 extends through the first annular wall 16 of the female pin 12, such that each male projection 84 contacts the ledge 44.

In another embodiment of any of the fasteners 10 described above, the annular projection 88 has an inner surface 90 and an outer surface 92, and the distal end 32 of each female arm 28 contacts the inner surface 90 of the annular projection 88.

In another embodiment of any of the fasteners 10 described above, each male projection 84 has a projection height, $H_{MP}$; and the ledge 44 has a width, $W_{FL}$, that is equal to, or greater than, the projection height, $H_{MP}$.

In another embodiment of any of the fasteners 10 described above, the male pin 14 has an outer male projection diameter, $OD_{MP}$, that is greater than an inner diameter, $ID_{FAW}$, of the first annular wall 16.

In another embodiment of any of the fasteners 10 described above, the distal end 76 of the male arm 72 is capable of being reversibly displaced towards a central axis, B, of the male pin 14 at a displacement distance, $DD_M$, that is equal to, or greater than, a projection height, $H_{MP}$, of the male projection 84 of each respective male arm 72.

In another embodiment of any of the fasteners 10 described above, the distal end 32 of the female arm 28 is capable of being reversibly displaced towards a central axis, A, of the female pin 12 at a displacement distance, $DD_F$, that is equal to, or greater than, a projection height, $H_{FP}$, of the female projection 40 of each respective female arm 28.

In an embodiment, an expandable barrier 600 is provided. The expandable barrier 600 includes (A) a plurality of any of the fasteners 10 described above; (B) at least two posts (500a, 500b, 500c), each post (500a, 500b, 500c) having a post wall 502 and at least two post openings 504 extending through the post wall 502; and (C) a plurality of elongate articles 602. Each elongate article 602 has an article wall 604, a first article opening 610 extending through the article wall 604 at a first end 606 of the elongate article 602, and a second article opening 612 extending through the article wall 604 at a second end 608 of the elongate article 602, the elongate articles 602 arranged in a lattice pattern between the two posts (500a, 500b, 500c) such that (i) each of the first article openings 610 is aligned with one of (a) the post openings 504 or (b) the first article opening 610 of a different elongate article 602, and one of the fasteners 10 extends therethrough and forms a first rotatable connection 616; and (ii) each of the second article openings 612 is aligned with one of (a) the post openings 504 or (b) the second article opening 612 of a different elongate article 602, and one of the fasteners 10 extends therethrough and forms a second rotatable connection 618.

In another embodiment of the expandable barrier 600 described above, each post (500a, 500b, 500c) is rotatably connected to at least two elongate articles 602.

In another embodiment of any of the expandable barriers 600 described above, each elongate article 602 further includes a third article opening 620 extending through the article wall 604 at a position between the first article opening 610 and the second article opening 612; and each third article opening 620 is aligned with the third article opening 620 of a different elongate article 602, and one of the fasteners 10 extends therethrough and forms a third rotatable connection 622.

In another embodiment of any of the expandable barriers 600 described above, the at least two posts (500a, 500b, 500c) are parallel posts extending along a vertical axis, V, and the at least two posts (500a, 500b, 500c) are movable with respect to each other along an expanding axis, Y, that is perpendicular to the vertical axis, V.

In an embodiment, a method of forming a connection between two articles is provided. The method includes (A) providing a female pin 12; (B) providing a male pin 14; (C) providing a first article 100 having a first wall 102 and a first opening 104 extending through the first wall 104; (D) providing a second article 200 having a second wall 202 and a second opening extending 204 through the second wall

202, the second wall 202 having a second ledge 212; (E) aligning the first opening 104 with the second opening 204; (F) inserting the female pin 12 through the first opening 104 and the second opening 204, such that each female projection 40 contacts the second ledge 212; and (G) inserting the male pin 14 through the first annular wall 16 of the female pin 12, such that the male pin 14 extends through the second opening 204 and the first opening 104, and each male projection 84 contacts the first ledge 44, thereby forming a connection between the first article 100 and the second article 200.

In another embodiment of the method disclosed above, the female pin 12 is any of the female pins 12 disclosed above.

In another embodiment of any of the methods disclosed above, the male pin 14 is any of the male pins 14 disclosed above.

In another embodiment of any of the methods disclosed above, the female pin 12 includes (i) a first annular wall 16 having a first end 18 and a second end 20; (ii) at least one female arm 28 extending from the first end 18 of the first annular wall 16, the female arm 28 having a proximal end 30, a distal end 32, a female arm outer surface 36, and a female projection 40 at the distal end 32 that extends from the female arm outer surface 36; and (iii) a first ledge 44 positioned at the second end 20 of the first annular wall 16.

In another embodiment of any of the methods disclosed above, the female pin 12 includes (i) a first annular wall 16 having a first end 18 and a second end 20; (ii) at least two female arms 28 extending from the first end 18 of the first annular wall 16, each female arm 28 having a proximal end 30, a distal end 32, and a female arm outer surface 36, and at least two of the female arms 28 includes a female projection 40 at the distal end 32 that extends from the female arm outer surface 36; and (iii) a first ledge 44 positioned at the second end 20 of the first annular wall 16.

In another embodiment of any of the methods disclosed above, the male pin 14 includes (i) a second annular wall 60 having a first end 62, a second end 64, and an outer diameter, $OD_{MAW}$; (ii) at least one male arm 72 extending from the first end 62 of the second annular wall 60, the male arm 72 having a proximal end 74, a distal end 74, a male arm outer surface 80, and a male projection 84 at the distal end 74 that extends from the male arm outer surface 80; and (iii) an annular projection 88 at the second end 64 of the second annular wall 60, the annular projection 88 having an outer annular diameter, $OD_{MAP}$, that is greater than the outer diameter, $OD_{MAW}$, of the second annular wall 60.

In another embodiment of any of the methods disclosed above, the male pin 14 includes (i) a second annular wall 60 having a first end 62, a second end 64, and an outer diameter, $OD_{MAW}$; (ii) at least two male arms 72 extending from the first end 62 of the second annular wall 60, each male arm 72 having a proximal end 74, a distal end 74, and a male arm outer surface 80, and at least two of the male arms 72 include a male projection 84 at the distal end 74 that extends from the male arm outer surface 80; and (iii) an annular projection 88 at the second end 64 of the second annular wall 60, the annular projection 88 having an outer annular diameter, $OD_{MAP}$, that is greater than the outer diameter, $OD_{MAW}$, of the second annular wall 60.

In another embodiment of the method disclosed above, the step of (F) inserting the female pin 12 through the first opening 104 and the second opening 204 further includes (i) displacing the distal end 32 of the female arm 28 from an original position, $OP_F$, towards a central axis, A, of the female pin 12 to a displaced position, $DP_F$; and (ii) returning the distal end 32 of the female arm 28 from the displaced position, DP$_F$, to the original position, OP$_F$, thereby placing the female projection 40 in contact with the second ledge 212.

In another embodiment of the method disclosed above, the step of (F) inserting the female pin 12 through the first opening 104 and the second opening 204 further includes (i) displacing the distal end 32 of each of the at least two female arms 28 from an original position, OP$_F$, towards a central axis, A, of the female pin 12 to a displaced position, DP$_F$; and (ii) returning the distal end 32 of each of the at least two female arms 28 from the displaced position, DP$_F$, to the original position, OP$_F$, thereby placing each female projection 40 in contact with the second ledge 212.

In another embodiment of any of the methods disclosed above, the step of (G) inserting the male pin 14 through the first annular wall 16 of the female pin 12 further includes (i) displacing the distal end 76 of the male arm 72 from an original position, OP$_M$, towards a central axis, B, of the male pin 14 to a displaced position, DP$_M$; and (ii) returning the distal end 76 of the male arm 72 from the displaced position, DP$_M$, to the original position, OP$_M$, thereby placing the male projection 74 in contact with the first ledge 44.

In another embodiment of any of the methods disclosed above, the step of (G) inserting the male pin 14 through the first annular wall 16 of the female pin 12 further includes (i) displacing the distal end 76 of each of the at least two male arms 72 from an original position, OP$_M$, towards a central axis, B, of the male pin 14 to a displaced position, DP$_M$; and (ii) returning the distal end 76 of each of the at least two male arms 72 from the displaced position, DP$_M$, to the original position, OP$_M$, thereby placing each male projection 74 in contact with the first ledge 44.

In another embodiment of any of the methods disclosed above, the step of (G) inserting the male pin 14 through the first annular wall 16 of the female pin 12 includes forming a rotatable connection between the first article 100 and the second article 200, whereby the first article 100 and the second article 200 are independently rotatable relative to a central axis, A, of the female pin 12.

In another embodiment of any of the methods disclosed above, the method includes providing a plurality of first articles 100 and a plurality of second articles 200, and each of the first articles 100 and second articles 200 is an elongate article.

In another embodiment of any of the methods disclosed above, the method further includes (H) providing at least two posts (500a, 500b, 500c), wherein the posts (500a, 500b, 500c) may be any of the posts (500a, 500b, 500c) disclosed above; (I) arranging the plurality of first articles 100 and the plurality of second articles 200 in a lattice pattern between the at least two posts (500a, 500b, 500c), wherein each first opening 104 is aligned with a second opening 204 or a post opening 504 and forms a rotatable connection via a fastener 10; and (J) forming an expandable barrier 600, which may be any of the expandable barriers 600 disclosed above.

By way of example, and not limitation, examples of the present disclosure are provided.

EXAMPLES

Example 1

A plurality of the fasteners of FIG. 2 are formed via injection molding with DELRIN 500P, available from DuPont de Nemours, Inc. (tensile modulus=3000 MPa). The female pins and male pins are produced having the dimensions provided in Table A.

Example 2

A plurality of the first articles and second article of FIGS. 22-28B are formed by CNC machining boards of EnXL PA6+30% GF. The first articles and the second articles have identical structures. The first articles and the second articles are elongate articles having the dimensions provided in Table A. Each of the first articles and the second articles has three openings that extends through the respective article wall.

TABLE A

| Structure | Description | Abbreviation | Distance (mm) |
|---|---|---|---|
| female pin | ledge width | W$_{FL}$ | 2.2 |
| | annular projection outer diameter | OD$_{FAP}$ | 34.8 |
| | first annular wall inner diameter | ID$_{FAW}$ | 16.9 |
| | first annular wall outer diameter | OD$_{FAW}$ | 22.1 |
| | female projection height | H$_{FP}$ | 2.4 |
| | female arm length | L$_{FA}$ | 26.0 |
| | first annular wall length | L$_{FAW}$ | 19.8 |
| | first annular wall thickness | T$_{FAW}$ | 3.2 |
| | outer female projection diameter | OD$_{FP}$ | 26.9 |
| male pin | annular projection outer diameter | OD$_{MAP}$ | 34.8 |
| | second annular wall inner diameter | ID$_{MAW}$ | 11.0 |
| | second annular wall outer diameter | OD$_{MAW}$ | 17.1 |
| | male projection height | H$_{MP}$ | 2.1 |
| | male arm length | L$_{MA}$ | 28.6 |
| | second annular wall length | L$_{MAW}$ | 25.8 |
| | second annular wall thickness | T$_{MAW}$ | 3.0 |
| | outer male projection diameter | OD$_{MP}$ | 19.9 |
| article | diameter of the interior surface | D$_{IS}$ | 23.9 |
| | ledge width | W$_{AL}$ | 2.8 |

Example 3

The expandable barrier of FIG. 34 is formed with the fasteners of Example 1 and the first and second articles of Example 2. A post is formed with metal using CNC machining to have two post openings that extend through the post wall. The bottom post opening has an oval shape, and the top post opening has a circular shape.

The expandable barrier is formed by aligning each opening in the articles with an opening in another article, or a post opening, to form a lattice pattern. A female pin is inserted through the aligned openings such that each female projection contacts a ledge of one of the articles; and a male pin is inserted through the first annular wall of each female pin such that the male pin extends through the aligned openings and each male projection contacts the female pin's first ledge. The expandable barrier can move between the deployed state and the stored state.

The insertion of the female and male pins is done by a user's finger applying pressure to the annular projection on each of the respective male and female pins. However, it is understood that the female and male pins could also be inserted by a machine.

It is specifically intended that the present disclosure not be limited to the embodiments and illustrations contained herein, but include modified forms of those embodiments including portions of the embodiments and combinations of elements of different embodiments as come within the scope of the following claims.

I claim:

1. A fastener comprising:

(A) a female pin comprising
  (i) a first annular wall comprising a first end and a second end;
  (ii) at least one female arm extending from the first end of the first annular wall, each female arm comprising a proximal end, a distal end, a female arm outer surface, and a female projection at the distal end that extends from the female arm outer surface; and
  (iii) a ledge at the second end of the first annular wall;

(B) a male pin comprising
  (i) a second annular wall comprising a first end, a second end, and an outer diameter, the second annular wall having a second annular wall length ($L_{MAW}$);
  (ii) at least two male arms extending from the first end of the second annular wall, the male arms each comprising a proximal end, a distal end, and a male arm outer surface, and at least one of the male arms comprising a male projection at the distal end that extends from the male arm outer surface, male arms, the at least two male arms having a male arm length ($L_{MA}$); and
  (iii) an annular projection at the second end of the second annular wall, the annular projection having an outer annular diameter that is greater than the outer diameter of the second annular wall;

the male pin extending through the first annular wall of the female pin, such that the male projection contacts the ledge;

wherein a $L_{MAW}:L_{MA}$ ratio is from 1:1 to 1:2; and wherein at least one of the at least two male arms is void of a male projection.

2. The fastener of claim 1, wherein the female pin comprises at least two of the female arms extending from the first end of the first annular wall, and at least two of the female arms comprise the female projection at the distal end that extends from the female arm outer surface.

3. The fastener of claim 1, wherein at least two of the male arms comprise the male projection at the distal end that extends from the male arm outer surface; and
  the male pin extends through the first annular wall of the female pin, such that each male projection contacts the ledge.

4. The fastener of claim 3, wherein the distal end of each of the at least two male arms is capable of being reversibly displaced towards a central axis of the male pin at a displacement distance that is equal to, or greater than, a projection height of the male projection of each respective male arm.

5. The fastener of claim 1, wherein the annular projection has an inner surface and an outer surface, and the distal end of each female arm contacts the inner surface of the annular projection.

6. The fastener of claim 1, wherein each male projection has a projection height; and
  the ledge has a width that is equal to, or greater than, the projection height.

7. The fastener of claim 1, wherein the male pin has an outer male projection diameter that is greater than an inner diameter of the first annular wall.

8. An expandable barrier comprising
(A) a plurality of the fasteners of claim 1;
(B) at least two posts, each post comprising a post wall and at least two post openings extending through the post wall; and (C) a plurality of elongate articles, each elongate article comprising an article wall, a first article opening extending through the article wall at a first end of the elongate article, and a second article opening extending through the article wall at a second end of the elongate article, the elongate articles arranged in a lattice pattern between the two posts such that
  (i) each of the first article openings is aligned with one of (a) the post openings or (b) the first article opening of a different elongate article, and one of the fasteners extends therethrough and forms a first rotatable connection; and
  (ii) each of the second article openings is aligned with one of (a) the post openings or (b) the second article opening of a different elongate article, and one of the fasteners extends therethrough and forms a second rotatable connection.

9. The expandable barrier of claim 8, wherein each post is rotatably connected to at least two elongate articles.

10. The expandable barrier of claim 9, wherein the at least two posts are parallel posts extending along a vertical axis, and the at least two posts are movable with respect to each other along an expanding axis that is perpendicular to the vertical axis.

11. The expandable barrier of claim 8, wherein
  each elongate article further comprises a third article opening extending through the article wall at a position between the first article opening and the second article opening; and
  each third article opening is aligned with the third article opening of a different elongate article, and one of the fasteners extends therethrough and forms a third rotatable connection.

12. A method of forming a connection between two articles comprising:
(A) providing a female pin comprising
  (i) a first annular wall comprising a first end and a second end;
  (ii) at least one female arm extending from the first end of the first annular wall, each female arm comprising a proximal end, a distal end, a female arm outer surface, and a female projection at the distal end that extends from the female arm outer surface; and
  (iii) a first ledge positioned at the second end of the first annular wall;
(B) providing a male pin comprising
  (i) a second annular wall comprising a first end, a second end, and an outer diameter, the second annular wall having a second annular wall length ($L_{MAW}$);
  (ii) at least two male arms extending from the first end of the second annular wall, the male arms each comprising a proximal end, a distal end, and a male arm outer surface, and at least one of the male arms comprising a male projection at the distal end that extends from the male arm outer surface, the at least two male arms having a male arm length ($L_{MA}$), wherein a $L_{MAW}:L_{MA}$ ratio is from 1:1 to 1:2, and wherein at least one of the at least two male arms is void of a male projection; and
  (iii) an annular projection at the second end of the second annular wall, the annular projection having an outer annular diameter that is greater than the outer diameter of the second annular wall;
(C) providing a first article comprising a first wall and a first opening extending through the first wall;

(D) providing a second article comprising a second wall and a second opening extending through the second wall, the second wall comprising a second ledge;

(E) aligning the first opening with the second opening;

(F) inserting the female pin through the first opening and the second opening, such that the female projection contacts the second ledge; and (G) inserting the male pin through the first annular wall of the female pin, such that the male pin extends through the second opening and the first opening, and the male projection contacts the first ledge, thereby forming a connection between the first article and the second article.

13. The method of claim 12, wherein the female pin comprises at least two of the female arms extending from the first end of the first annular wall, and at least two of the female arms comprise the female projection at the distal end that extends from the female arm outer surface;

at least two of the male arms comprise the male projection at the distal end that extends from the male arm outer surface; and the step of (F) inserting the female pin through the first opening and the second opening further comprises (i) displacing the distal end of each of the at least two female arms from an original position towards a central axis of the female pin to a displaced position; and (ii) returning the distal end of each of the at least two female arms from the displaced position to the original position, thereby placing each female projection in contact with the second ledge.

14. The method of claim 13, wherein the step of (G) inserting the male pin through the first annular wall of the female pin further comprises (i) displacing the distal end of each of the at least two male arms from an original position towards a central axis of the male pin to a displaced position; and (ii) returning the distal end of each of the at least two male arms from the displaced position to the original position, thereby placing each male projection in contact with the first ledge.

15. The method of claim 12, wherein the step of (G) inserting the male pin through the first annular wall of the female pin comprises forming a rotatable connection between the first article and the second article, whereby the first article and the second article are independently rotatable relative to a central axis of the female pin.

* * * * *